United States Patent
Sato et al.

(10) Patent No.: US 10,421,862 B2
(45) Date of Patent: Sep. 24, 2019

(54) PROCESS FOR PRODUCING PIGMENT-CONTAINING MODIFIED POLYMER PARTICLES

(71) Applicant: KAO CORPORATION, Tokyo (JP)

(72) Inventors: Takahiro Sato, Wakayama (JP); Yasufumi Ueda, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 15/539,591

(22) PCT Filed: Dec. 22, 2015

(86) PCT No.: PCT/JP2015/085839
§ 371 (c)(1),
(2) Date: Jun. 23, 2017

(87) PCT Pub. No.: WO2016/104505
PCT Pub. Date: Jun. 30, 2016

(65) Prior Publication Data
US 2018/0009988 A1    Jan. 11, 2018

(30) Foreign Application Priority Data
Dec. 24, 2014  (JP) ................. 2014-260591

(51) Int. Cl.

| | | |
|---|---|---|
| C09B 67/00 | (2006.01) | |
| C08J 3/05 | (2006.01) | |
| C08F 8/32 | (2006.01) | |
| C09B 67/46 | (2006.01) | |
| B41J 2/01 | (2006.01) | |
| B41M 5/00 | (2006.01) | |
| C08J 3/03 | (2006.01) | |
| C09D 11/037 | (2014.01) | |
| C09D 11/322 | (2014.01) | |
| B41J 2/21 | (2006.01) | |
| C08J 3/07 | (2006.01) | |
| C08J 3/21 | (2006.01) | |
| C09D 11/107 | (2014.01) | |

(52) U.S. Cl.
CPC .............. C09B 67/009 (2013.01); B41J 2/01 (2013.01); B41J 2/2107 (2013.01); B41M 5/00 (2013.01); C08J 3/03 (2013.01); C08J 3/07 (2013.01); C08J 3/212 (2013.01); C09B 67/0086 (2013.01); C09B 67/0091 (2013.01); C09D 11/037 (2013.01); C09D 11/107 (2013.01); C09D 11/322 (2013.01); C08J 2333/10 (2013.01)

(58) Field of Classification Search
CPC ......... C09B 67/0066; C08J 3/05; C08J 3/212; C08F 8/30; C08F 8/32
See application file for complete search history.

(56) References Cited

U.S. PATENT DOCUMENTS

| | | | |
|---|---|---|---|
| 8,129,448 B2 * | 3/2012 | Lee .................. | C09B 68/24 347/1 |
| 8,613,508 B2 * | 12/2013 | Yoshida ............... | C09D 11/322 347/100 |
| 9,133,356 B2 * | 9/2015 | Yoshida ............... | C09D 11/326 |
| 2006/0087719 A1 | 4/2006 | Kosuge | |
| 2006/0211791 A1 | 9/2006 | Burns et al. | |
| 2009/0014682 A1 | 1/2009 | Takahashi et al. | |
| 2011/0257309 A1 | 10/2011 | Yoshida et al. | |

(Continued)

FOREIGN PATENT DOCUMENTS

| | | |
|---|---|---|
| EP | 1 897 919 A1 | 3/2008 |
| EP | 2 495 290 A1 | 9/2010 |
| JP | 9-272831 A | 10/1997 |
| JP | 11-12410 A | 1/1999 |
| JP | 11-343439 A | 12/1999 |
| JP | 2000-212367 A | 8/2000 |
| JP | 2004-217788 A | 8/2004 |
| JP | 2006-146191 A | 6/2006 |
| JP | 2006-321932 A | 11/2006 |
| JP | 2008-150535 A | 7/2008 |
| JP | 2008-156463 A | 7/2008 |

(Continued)

OTHER PUBLICATIONS

DENACOL EX-321 Product Information. (Year: 2018).*

(Continued)

*Primary Examiner* — Vu A Nguyen
(74) *Attorney, Agent, or Firm* — Birch, Stewart, Kolasch & Birch, LLP

(57) ABSTRACT

The present invention relates to [1] a process for producing pigment-containing modified polymer particles, including the step of reacting pigment-containing polymer particles (A) containing a functional group and a compound (B) containing a reactive group capable of reacting with the functional group of the polymer particles (A) in a medium under such a condition that a ratio [(B)/(A)] of total moles of the reactive group of the compound (B) to total moles of the functional group of the polymer particles (A) is from 0.10 to 0.62; [2] a pigment water dispersion including an aqueous medium and the modified polymer particles produced by the aforementioned process which are dispersed in the aqueous medium; and [3] an ink including the aforementioned pigment water dispersion and an organic solvent. The modified polymer particles are free from formation of coarse particles upon production of pigment particles, so that an ink obtained by using the modified polymer particles can be prevented from suffering from increase in viscosity thereof when the ink is being concentrated by evaporation of water from the ink, and is excellent in rub fastness when printed on a low-water absorbing recording medium.

11 Claims, No Drawings

(56) References Cited

U.S. PATENT DOCUMENTS

2011/0306708 A1  12/2011  Hiraishi et al.

FOREIGN PATENT DOCUMENTS

| JP | 2008-531762 A | 8/2008 |
| JP | 2010-13525 A | 1/2010 |
| JP | 2010-143961 A | 7/2010 |

OTHER PUBLICATIONS

International Search Report for PCT/JP2015/085839 (PCT/ISA/210) dated Mar. 15, 2016.
Extended European Search Report issued in corresponding European Application No. 15873073 dated Apr. 20, 2018.

* cited by examiner

PROCESS FOR PRODUCING PIGMENT-CONTAINING MODIFIED POLYMER PARTICLES

FIELD OF THE INVENTION

The present invention relates to a process for producing pigment-containing modified polymer particles, a pigment water dispersion of the modified polymer particles obtained by the process, and an ink containing the pigment water dispersion.

BACKGROUND OF THE INVENTION

In ink-jet printing methods, droplets of ink are directly projected onto a recording medium from very fine nozzles and allowed to adhere to the recording medium to form characters or images thereon. The ink-jet printing methods have become rapidly spread because of various advantages such as easiness of full coloration, low cost, capability of using a plain paper as the recording medium, non-contact with printed characters or images, etc.

In recent years, in order to impart good weathering resistance and water resistance to printed matters, an ink that contains a pigment as a colorant has been extensively used. In view of attaining good ejection stability and storage stability of the ink, in order to stably compound the pigment in the ink, the technologies for encapsulating the pigment with a polymer using a dispersant capable of modifying a surface of the pigment, etc., have been developed.

JP 9-272831A (Patent Literature 1) aims at providing a recording medium liquid that is excellent in long-term storage stability of pigment components, density and clarity of images formed, etc., and discloses an recording medium liquid for ink-jet printing which contains a pigment composite polymer obtained by heating a polymer including a segment (A) containing a reactive group capable of reacting with a functional group present on a surface of the pigment and a segment containing no reactive group and having a higher affinity to a liquid medium than that of the segment (A), together with the pigment.

JP 11-343439A (Patent Literature 2) aims at providing an ink that is capable of forming images having high image density and excellent rub fastness, etc., as well as is excellent in ink-jet ejection stability, and discloses an ink including a pigment and a resin encapsulating the pigment in which the pigment is a self-dispersible carbon black containing at least one hydrophilic group bonded to a surface thereof.

JP 2010-13525A (Patent Literature 3) aims at providing a water-based ink for ink-jet printing which is excellent in optical density, storage stability, etc., and discloses a water dispersion for ink-jet printing which includes a surface-treated carbon black containing an organic group having a constitutional unit constituted of an alkylene glycol on a surface thereof.

SUMMARY OF THE INVENTION

The present invention relates to a process for producing pigment-containing modified polymer particles, including the step of:

reacting pigment-containing polymer particles (A) containing a functional group and a compound (B) containing a reactive group capable of reacting with the functional group of the polymer particles (A) in a medium under such a condition that a ratio [(B)/(A)] of total moles of the reactive group of the compound (B) to total moles of the functional group of the polymer particles (A) is not less than 0.10 and not more than 0.62.

DETAILED DESCRIPTION OF THE INVENTION

In the technologies described in Patent Literatures 1 and 3, although the pigment particles are produced by reacting the polymer or specific organic group onto the surface of the pigment, coarse particles tend to be included in the resulting pigment particles upon production of the pigment particles in some cases. In addition, when the ink containing the pigment particles is being concentrated by removal of water from the ink upon drying, the ink tends to suffer from rapid increase in viscosity thereof, and therefore the ink tends to be insufficient in ejection stability owing to the residual ink in nozzles. Furthermore, when characters or images are printed on a low-water absorbing recording medium using the ink, the resulting printed characters or images tend to be insufficient in rub fastness.

The present invention relates to a process for producing pigment-containing modified polymer particles which is excellent in productivity of fine pigment particles, and has such an advantage that an ink produced by using the modified polymer particles can be prevented from suffering from increase in viscosity thereof when the ink is being concentrated by evaporation of water therefrom, and is excellent in rub fastness of the printed characters or images when printed on a low-water absorbing recording medium; and a pigment water dispersion and an ink including the pigment-containing modified polymer particles obtained by the process.

The present inventors have found that by reacting pigment-containing polymer particles (A) containing a functional group and a compound (B) containing a reactive group capable of reacting with the functional group of the polymer particles (A) at a specific molar ratio to modify the polymer particles, it is possible to solve the aforementioned conventional problems.

That is, the present invention relates to the following aspects [1] to [3].

[1] A process for producing pigment-containing modified polymer particles, including the step of;
  reacting pigment-containing polymer particles (A) containing a functional group and a compound (B) containing a reactive group capable of reacting with the functional group of the polymer particles (A) in a medium under such a condition that a ratio [(B)/(A)] of total moles of the reactive group of the compound (B) to total moles of the functional group of the polymer particles (A) is not less than 0.10 and not more than 0.62.

[2] A pigment water dispersion including an aqueous medium and the modified polymer particles produced by the process as defined in the above aspect [1] which are dispersed in the aqueous medium.

[3] An ink including the pigment water dispersion as defined in the above aspect [2], and at least one solvent selected from the group consisting of water and an organic solvent.

The present invention provides a process for producing pigment-containing modified polymer particles which is excellent in productivity of fine pigment particles, and has such an advantage that an ink produced by using the modified polymer particles can be prevented from suffering from increase in viscosity thereof when the ink is being concentrated by evaporation of water therefrom and is excellent in rub fastness of the printed characters or images when printed on a low-water absorbing recording medium; and a pigment water dispersion and an ink including the pigment-containing modified polymer particles obtained by the process. In addition, according to the present invention, it is possible to reduce burden on production of the modified polymer particles because a dispersion of the modified polymer particles has good filterability.

The ink containing the pigment water dispersion according to the present invention can be suitably used as an ink for ink-jet printing.

[Process for Producing Pigment-Containing Modified Polymer Particles]

The process for producing pigment-containing modified polymer particles according to the present invention is characterized by including the step of:

reacting pigment-containing polymer particles (A) containing a functional group (hereinafter also referred to merely as "polymer particles (A)") and a compound (B) containing a reactive group capable of reacting with the functional group of the polymer particles (A) in a medium under such a condition that a ratio [(B)/(A)] of total moles of the reactive group of the compound (B) to total moles of the functional group of the polymer particles (A) is not less than 0.10 and not more than 0.62.

According to the present invention, it is possible to achieve good characteristics of an ink including excellent productivity of fine pigment particles, capability of suppressing deterioration in stability of the ink when water is removed from the ink by drying while preventing increase in viscosity thereof (i.e., suppressing increase in viscosity of the ink owing to increase in concentration thereof), and further excellent rub fastness of the printed characters or images when printed on a low-water absorbing recording medium. The reason why the aforementioned advantages can be achieved by the present invention is considered as follow, though it is not clearly determined yet.

That is, the pigment-containing polymer particles (A) has a high dispersion efficiency in a medium and is well atomized as compared to a simple pigment, and the thus atomized polymer particles (A) are reacted with the compound (B). Therefore, it is considered that formation of coarse particles in the polymer particles can be suppressed.

Also, the functional group present on the surface of the polymer particles (A) is reacted with the reactive group of the compound (B) to form such a structure in which a structural portion derived from the compound (B) is bonded to the surface of the respective polymer particles. Therefore, it is considered that owing to the steric repulsion that occurs between dispersibility of the polymer particles (A) and the structural portion derived from the compound (B), an ink containing the polymer particles can be prevented from suffering from increase in viscosity thereof when the ink is being concentrated by evaporation of water from the ink.

Furthermore, it is considered that since formation of coarse particles in the ink is suppressed after drying the ink on the recording medium, the surface of the recording medium being printed can be improved in smoothness. In addition, it is considered that since the structural portions derived from the compound (B) are aggregated together between the polymer particles (A), the bonding force between the polymer particles (A) can be increased, so that the resulting ink can be improved in rub fastness.

In the following, the respective components used in the present invention as well as the methods for production thereof are described.

<Pigment-Containing Polymer Particles (a)>

(Pigment)

The pigment used in the present invention is not particularly limited, and may be either an organic pigment or an inorganic pigment and may also be used in a mixture thereof.

Examples of the organic pigment include at least one pigment selected from the group consisting of condensed polycyclic pigments such as anthraquinone pigments, quinacridone pigments, indigo pigments, dioxazine pigments, perylene pigments, perinone pigments, isoindolinone pigments, isoindoline pigments, phthalocyanine pigments, quinophthalone pigments and diketopyrrolopyrrole pigments, and azo pigments such as disazo pigments and condensed azo pigments. Of these organic pigments, from the viewpoint of improving color reproducibility of characters or images printed, more preferred is at least one pigment selected from the group consisting of quinacridone pigments, azo pigments and phthalocyanine pigments.

Specific examples of the quinacridone pigments include C.I. PR (Pigment Red) 122, PR 192, PR 202, PR 207 and PR 209, C.I. PV (Pigment Violet) 19, etc. Of these quinacridone pigments, preferred is at least one pigment selected from the group consisting of C.I. PR 122 and C.I. PV 19. Specific examples of the azo pigments include C.I. PY (Pigment Yellow) 74, PY 151, PY 154, PY 155, PY 180 and PY 213. Of these azo pigments, preferred is at least one pigment selected from the group consisting of C.I. PY 74 and C.I. PY 154. Specific examples of the phthalocyanine pigments include C.I. PB (Pigment Blue) 15:1, PB 15:2, PB 15:3, PB 15:4, PB 15:5, PB 15:6, PB 16, PG (Pigment Green) 7 and PG 36. Of these phthalocyanine pigments, preferred is at least one pigment selected from the group consisting of C.I. PB 15:3 and C.I. PB 15:4.

The organic pigment also includes a derivative of the organic pigment as the raw material. The organic pigment derivative may be produced by subjecting the organic pigment to such a treatment in which a functional group such as a hydroxy group, a carboxy group, a carbamoyl group, a sulfo group, a sulfonamide group and a phthalimidomethyl group is bonded to the surface of the organic pigment.

Examples of the inorganic pigment include carbon blacks and metal oxides such as alumina and titanium dioxide. These inorganic pigments may be treated with a conventionally known hydrophobization agent such as a titanium coupling agent, a silane coupling agent and a higher fatty acid metal salt.

The carbon blacks are preferably used for black inks. The carbon blacks include furnace blacks, thermal lamp blacks, acetylene blacks and channel blacks, and may be surface-treated carbon blacks.

(Polymer)

In the present invention, the polymer is used for the purpose of improving dispersion stability of the pigment in the medium.

From the viewpoint of improving dispersibility of the pigment, the polymer is preferably an anionic polymer. The term "anionic" as used herein means that a pH value of a non-neutralized substance is less than 7 when dispersed or dissolved in pure water, or in the case where the substance is insoluble in pure water and the pH value thereof is therefore clearly unmeasurable, the term "anionic" as used herein means that a zeta potential of a dispersion prepared by dispersing the substance in pure water is negative. Examples of the polymer include those polymers containing at least one group selected from the group consisting of a carboxy group, a sulfonic group, a phosphoric group, a phosphonic group, a hydroxy group and a glycidyl group. Of these polymers, preferred are those polymers containing at least one group selected from the group consisting of a carboxy group, a sulfonic group and a phosphoric group.

(Anionic Polymer)

The anionic polymer is preferably in the form of a water-insoluble polymer from the viewpoint of enhancing optical density of the ink including the pigment water dispersion. The water-insoluble polymer as used herein means a polymer exhibiting a solubility in water of 10 g or lower, preferably 5 g or lower and more preferably 1 g or lower when the polymer is dried to a constant weight at 105° C. for 2 hours, and then dissolved in 100 g of water at 25° C. In the case where the polymer is in the form of an anionic polymer, the solubility means solubility of the polymer whose anionic groups are neutralized completely (i.e., 100%) with sodium hydroxide.

Examples of the anionic polymer used in the present invention include polyesters, polyurethanes and vinyl-based polymers. Among these polymers, preferred are vinyl-based polymers, and more preferred are those vinyl-based polymers obtained by addition-polymerizing at least one vinyl monomer selected from the group consisting of vinyl compounds, vinylidene compounds and vinylene compounds from the viewpoint of improving storage stability of the pigment water dispersion.

The anionic vinyl-based polymer is preferably a vinyl-based polymer that is produced by copolymerizing a monomer mixture containing (a) an anionic monomer (hereinafter also referred to merely as a "component (a)") and (b) a hydrophobic monomer (hereinafter also referred to merely as a "component (b)") (such a mixture is hereinafter also referred to merely as a "monomer mixture"). The vinyl-based polymer contains a constitutional unit derived from the component (a) and a constitutional unit derived from the component (b). Among them, the vinyl-based polymer more preferably further contains a constitutional unit derived from (c) a macromer (hereinafter also referred to merely as a "component (c)").

[(a) Anionic Monomer]

The anionic monomer (a) is preferably used as a constituent of the anionic polymer from the viewpoint of stably dispersing the pigment-containing polymer particles (A) in the ink.

It is considered that the constitutional unit derived from the anionic monomer (a) serves for stably dispersing the pigment in the water dispersion owing to electrostatic repulsion thereof.

In addition, for example, in the case where the anionic group of the anionic monomer is a carboxy group, the functional group present on the surface of the respective polymer particles (A) is the carboxy group. As a result, the reactive group contained in the compound (B) is reacted with the carboxy group, so that the polymer particles (A) are formed into the pigment-containing modified polymer particles.

Examples of the anionic monomers include carboxylic acid monomers, sulfonic acid monomers and phosphoric acid monomers.

Specific examples of the carboxylic acid monomers include acrylic acid, methacrylic acid, crotonic acid, itaconic acid, maleic acid, fumaric acid, citraconic acid and 2-methacryloyloxymethylsuccinic acid.

Specific examples of the sulfonic acid monomers include styrenesulfonic acid, 2-acrylamido-2-methylpropanesulfonic acid and 3-sulfopropyl (meth)acrylate.

Specific examples of the phosphoric acid monomers include vinylphosphonic acid, vinyl phosphate, bis(meth-acryloxyethyl)phosphate, diphenyl-2-acryloyloxyethyl phosphate and diphenyl-2-methacryloyloxyethyl phosphate.

Among the anionic monomers, from the viewpoint of improving dispersion stability of the anionic polymer particles in the ink, preferred are the carboxylic acid monomers, and more preferred are acrylic acid and methacrylic acid. Meanwhile, the "(meth)acrylate" as used herein means an acrylate and/or a methacrylate.

[(b) Hydrophobic Monomer]

The hydrophobic monomer (b) is used as a constituent of the anionic polymer from the viewpoint of promoting adsorption of the polymer onto the surface of the pigment to improve dispersion stability of the pigment in the dispersion as well as from the viewpoint of enhancing optical density of the ink including the resulting pigment water dispersion.

Examples of the hydrophobic monomer include at least one monomer selected from the group consisting of alkyl (meth)acrylates and aromatic group-containing monomers from the viewpoint of facilitating production of the polymer.

The preferred alkyl (meth)acrylates are those containing an alkyl group having 1 to 22 carbon atoms and preferably 6 to 18 carbon atoms. Examples of the alkyl (meth)acrylates include methyl (meth)acrylate, ethyl (meth)acrylate, (iso) propyl (meth)acrylate, (iso- or tertiary-)butyl (meth)acrylate, (iso)amyl (meth) acrylate, cyclohexyl (meth) acrylate, 2-ethylhexyl (meth) acrylate, (iso)octyl (meth) acrylate, (iso)decyl (meth) acrylate, (iso)dodecyl (meth)acrylate and (iso)stearyl (meth)acrylate.

Meanwhile, the terms "(iso- or tertiary-)" and "(iso)" as used herein mean both of the structure in which the groups expressed by "iso or tertiary" and "iso" respectively are present, and the structure in which these groups are not present (i.e., normal).

The aromatic group-containing monomer is preferably a vinyl monomer containing an aromatic group having 6 to 22 carbon atoms which may contain a substituent group having a hetero atom, and more preferably a styrene-based monomer or an aromatic group-containing (meth)acrylate. It is also preferred that these aromatic group-containing monomers are used in combination with each other.

Specific examples of the preferred styrene-based monomer include styrene, 2-methyl styrene and divinyl benzene. Among these styrene-based monomers, more preferred is styrene.

Specific examples of the preferred aromatic group-containing (meth)acrylate include benzyl (meth)acrylate and phenoxyethyl (meth)acrylate. Among these aromatic group-containing (meth)acrylates, more preferred is benzyl (meth) acrylate.

[(c) Macromer]

The macromer (c) is in the form of a compound containing a polymerizable functional group at one terminal end thereof and having a number-average molecular weight of from 500 to 100,000, and is preferably used as a constituent of the anionic polymer from the viewpoint of improving dispersion stability of the anionic polymer particles in the ink. The polymerizable functional group bonded to one terminal end of the macromer is preferably an acryloyloxy group or a methacryloyloxy group, and more preferably a methacryloyloxy group.

The number-average molecular weight of the macromer (c) is preferably not less than 1,000 and not more than 10,000. Meanwhile, the number-average molecular weight of the macromer (c) may be measured by gel chromatography using chloroform containing 1 mmol/L of dodecyl dimethylamine as a solvent and using polystyrene as a reference standard substance.

As the macromer (c), from the viewpoint of improving dispersion stability of the anionic polymer particles in the ink, there are preferably used an aromatic group-containing monomer-based macromer and a silicone-based macromer. Among these macromers, more preferred is the aromatic group-containing monomer-based macromer.

Examples of an aromatic group-containing monomer constituting the aromatic group-containing monomer-based macromer include those aromatic group-containing monomers as described with respect to the above hydrophobic monomer (b). Among these aromatic group-containing monomers, preferred are styrene and benzyl (meth)acrylate, and more preferred is styrene.

Specific examples of commercially available products of the styrene-based macromer include "AS-6(S)", "AN-6(S)" and "HS-6(S)" all available from Toagosei Co., Ltd., etc.

Examples of the silicone macromer include organopolysiloxanes containing a polymerizable functional group bonded to one terminal end thereof, etc. Typical examples of the silicone macromer include those compounds represented by the following formula.

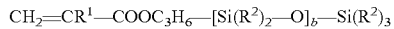

wherein $R^1$ is a hydrogen atom or a methyl group; $R^2$ is a hydrogen atom or an alkyl group having 1 to 5 carbon atoms; and b is a number of 5 to 60.

Examples of commercially available products of the silicone macromer include "SILAPLANE FM-0711", "SILAPLANE FM-0721" and "SILAPLANE FM-0725" all available from JNC Corporation, etc.

[(d) Nonionic Monomer]

The anionic vinyl-based polymer may further contain (d) a nonionic monomer (hereinafter also referred to merely as a "component (d)") as a constituent thereof.

Examples of the component (d) include 2-hydroxyethyl (meth)acrylate, 3-hydroxypropyl (meth) acrylate, polyalkylene glycol (meth) acrylates such as polypropylene glycol (n=2 to 30 wherein n represents an average molar number of addition of oxyalkylene groups: hereinafter defined in the same way) (meth)acrylate, alkoxy polyalkylene glycol (meth)acrylates such as methoxy polyethylene glycol (n=1 to 30) (meth)acrylate, and phenoxy (ethylene glycol/propylene glycol copolymer) (n=1 to 30 in which n for ethylene glycol: 1 to 29) (meth)acrylate. Among these compounds as the component (d), preferred are polypropylene glycol (n=2 to 30) (meth)acrylate and phenoxy (ethylene glycol/propylene glycol copolymer) (meth)acrylate, and more preferred is a combination of the (meth)acrylates.

Specific examples of commercially available products of the component (d) include "BLEMMER PE-90", "BLEMMER PE-200", "BLEMMER PE-350", "BLEMMER PME-100", "BLEMMER PME-200", "BLEMMER PME-400", "BLEMMER PME-1000", "BLEMMER PP-500", "BLEMMER PP-800", "BLEMMER PP-1000", "BLEMMER AE-90", "BLEMMER AE-200", "BLEMMER AE-400", "BLEMMER AP-150", "BLEMMER AP-400", "BLEMMER AP-550" and "BLEMMER 50PEP-300" (all containing a hydroxy group), "BLEMMER 50POEP-800B", "BLEMMER 43PAPE-600B", "BLEMMER GLM" (containing a hydroxy group), "BLEMMER LA", "BLEMMER CA", "BLEMMER SA", "BLEMMER LMA", "BLEMMER CMA", "BLEMMER SMA", "BLEMMER G" (containing a glycidyl group) and "EPIOL Series A" (containing a glycidyl group) all available from NOF Corporation; and "NK ESTER M-20G", "NK ESTER M-40G", "NK ESTER M-90G", "NK ESTER M-230G" and "NK ESTER S" (as a monofunctional methacrylate) all available from Shin-Nakamura Chemical Co., Ltd.

The aforementioned components (a) to (d) may be respectively used alone or in the form of a mixture of any two or more thereof.

The contents of the constitutional units derived from the components (a) to (c) in the anionic vinyl-based polymer (contents of non-neutralized components; hereinafter defined in the same way) are as follows.

The content of the component (a) is preferably not less than 2% by mass, more preferably not less than 5% by mass and even more preferably not less than 10% by mass, and is also preferably not more than 40% by mass, more preferably not more than 30% by mass and even more preferably not more than 25% by mass, from the viewpoint of improving dispersion stability of the polymer particles (A) in the ink.

The content of the component (b) is preferably not less than 30% by mass, more preferably not less than 40% by mass and even more preferably not less than 50% by mass, and is also preferably not more than 90% by mass, more preferably not more than 80% by mass and even more preferably not more than 70% by mass, from the viewpoint of enhancing optical density of the ink.

The content of the component (c) is preferably not less than 2% by mass, more preferably not less than 4% by mass and even more preferably not less than 6% by mass, and is also preferably not more than 30% by mass, more preferably not more than 25% by mass and even more preferably not more than 20% by mass, from the viewpoint of improving dispersion stability of the polymer particles (A) in the ink.

The mass ratio of the component (a) to a sum of the component (b) and the component (c) [component (a)/[component (b)+component (c)]] is preferably not less than 0.02, more preferably not less than 0.05 and even more preferably not less than 0.10, and is also preferably not more than 0.8, more preferably not more than 0.6 and even more preferably not more than 0.4, from the viewpoint of improving dispersion stability of the polymer particles (A) in the ink and enhancing optical density of the ink.

(Production of Anionic Vinyl-Based Polymer)

The anionic vinyl-based polymer may be produced by copolymerizing the aforementioned monomer mixture by known polymerization methods. Among the polymerization methods, preferred is a solution polymerization method.

The solvent used in the solution polymerization method is not particularly limited. From the viewpoint of enhancing productivity of the water dispersion of the pigment-containing polymer particles (A), preferred is at least one organic solvent selected from the group consisting of ketones having not less than 3 and not more than 8 carbon atoms, alcohols, ethers and esters, more preferred are ketones having not less than 4 and not more than 8 carbon atoms, and even more preferred is methyl ethyl ketone.

The polymerization may be carried out in the presence of a polymerization initiator or a chain transfer agent. As the polymerization initiator, preferred are azo compounds, and more preferred is 2,2'-azobis(2,4-dimethylvaleronitrile). As the chain transfer agent, preferred are mercaptans, and more preferred is 2-mercaptoethanol.

The preferred polymerization conditions may vary depending upon the kinds of polymerization initiators, monomers and solvents used, etc. The polymerization temperature is preferably not lower than 50° C. and more preferably not lower than 55° C., and is also preferably not higher than 90° C. and more preferably not higher than 80° C. The polymerization time is preferably not less than 1 hour and not more than 20 hours. Furthermore, the atmosphere used in the polymerization is preferably a nitrogen gas atmosphere or an atmosphere of an inert gas such as argon.

After completion of the polymerization reaction, the polymer thus produced may be isolated from the reaction solution by a known method such as reprecipitation and removal of the solvent by distillation. The thus obtained polymer may also be subjected to reprecipitation, membrane separation, chromatography, extraction, etc., for removing unreacted monomers, etc., therefrom.

The resulting polymer is preferably used in the form of a polymer solution as such without removing the solvent used in the polymerization reaction therefrom from the viewpoint of enhancing productivity of the water dispersion of the pigment-containing polymer particles (A).

The solid content of the thus obtained polymer solution is preferably not less than 30% by mass and more preferably not less than 35% by mass, and is also preferably not more than 60% by mass and more preferably not more than 50% by mass from the viewpoint of enhancing productivity of the water dispersion of the pigment-containing polymer particles (A).

The weight-average molecular weight of the anionic polymer used in the present invention is preferably not less than 5,000, more preferably not less than 10,000, even more preferably not less than 20,000, further even more preferably not less than 30,000 and still further even more preferably not less than 50,000, and is also preferably not more than 500,000, more preferably not more than 400,000, even more preferably not more than 300,000 and further even more preferably not more than 200,000, from the viewpoint of improving dispersion stability of the pigment-containing polymer particles (A) in the ink as well as from the viewpoint of enhancing optical density of the ink.

Meanwhile, the weight-average molecular weight may be measured by the method described in Examples below.

The polymer used in the present invention is preferably produced by the aforementioned method, and commercially available products may also be used as the polymer.

The commercially available polymer is preferably in the form of a polymer containing a constitutional unit derived from the component (a) in an amount of preferably not less than 2% by weight, more preferably not less than 5% by weight, even more preferably not less than 10% by weight and further even more preferably not less than 15% by weight, and also preferably not more than 80% by weight, more preferably not more than 60% by weight, even more preferably not more than 40% by weight, further even more preferably not more than 30% by weight and still further even more preferably not more than 25% by weight, and a constitutional unit derived from the component (b) in an amount of preferably not less than 15% by weight, more preferably not less than 20% by weight, even more preferably not less than 30% by weight, further even more preferably not less than 40% by weight, still further even more preferably not less than 50% by weight and still further even more preferably not less than 60% by weight, and also preferably not more than 95% by weight, more preferably not more than 90% by weight, even more preferably not more than 85% by weight, further even more preferably not more than 80% by weight and still further even more preferably not more than 70% by weight.

As the constitutional unit derived from the component (a), a constitutional unit derived from acrylic acid and/or methacrylic acid is preferred, whereas as the constitutional unit derived from the component (b), a constitutional unit derived from a styrene monomer is preferred. From the aforementioned viewpoints, the water-soluble polymer is preferably a styrene-acrylic polymer containing constitutional units derived from acrylic acid and/or methacrylic acid and a styrene monomer.

The weight-average molecular weight of the styrene-acrylic polymer is preferably not less than 1,000, more preferably not less than 2,000, even more preferably not less than 5,000 and further even more preferably not less than 10,000, and is also preferably not more than 500,000, more preferably not more than 400,000, even more preferably not more than 300,000, further even more preferably not more than 200,000 and still further even more preferably not more than 100,000, from the viewpoint of improving dispersion stability of the pigment-containing polymer particles (A) in the ink and enhancing optical density of the ink.

The acid value of the styrene-acrylic polymer is preferably not less than 100 mgKOH/g, more preferably not less than 120 mgKOH/g and even more preferably not less than 150 mgKOH/g, and is also preferably not more than 300 mgKOH/g, more preferably not more than 280 mgKOH/g and even more preferably not more than 250 mgKOH/g.

Examples of commercially available product of the styrene-acrylic polymer include those styrene-acrylic polymers "JONCRYL (registered trademark) 67", "JONCRYL 68", "JONCRYL 678", "JONCRYL 680", "JONCRYL 682", "JONCRYL 683", "JONCRYL 690" and "JONCRYL 819" all available from BASF Corporation.

<Production of Pigment-Containing Polymer Particles (A)>

The pigment-containing polymer particles (A) can be efficiently produced in the form of a water dispersion thereof by the process including the following steps (1) and (2).

Step (1): subjecting a mixture containing the anionic polymer, the organic solvent, the pigment and water to dispersion treatment to obtain a dispersion of pigment-containing polymer particles; and Step (2): removing the organic solvent from the dispersion obtained in the step (1) to obtain a water dispersion of the pigment-containing polymer particles (A).

[Step (1)]

In the step (1), there is preferably used the method in which the anionic polymer is first dissolved in the organic solvent, and then the pigment and water, if required, together with a neutralizing agent, a surfactant and the like, are added and mixed in the resulting organic solvent solution to obtain a dispersion of an oil-in-water type. The order of addition of the respective components added to the anionic polymer organic solvent solution is not particularly limited, and it is preferred that the neutralizing agent, water and the pigment are successively added in this order.

The organic solvent used for dissolving the anionic polymer is not particularly limited. Examples of the organic solvent include alcohol solvents such as ethanol, isopropanol and isobutanol; ketone solvents such as acetone, methyl ethyl ketone, methyl isobutyl ketone and diethyl ketone; and ether solvents such as dibutyl ether, tetrahydrofuran and dioxane. The solubility of these organic solvents in 100 g of water as measured at 20° C. is preferably not less than 5 g and more preferably not less than 10 g, and is more specifically preferably from 5 to 80 g and more preferably from 10 to 50 g. In particular, of these organic solvents, preferred are acetone, methyl ethyl ketone and methyl isobutyl ketone.

When the anionic polymer is synthesized by a solution polymerization method, the solvent used in the polymerization may be used as such in the step (1).

When neutralizing the anionic polymer using a neutralizing agent, the pH value of the water dispersion of the anionic polymer is controlled to preferably not less than 6.5 and more preferably not less than 7 and also controlled to preferably not more than 11 and preferably not more than 10. Examples of the neutralizing agent include bases such as lithium hydroxide, sodium hydroxide, potassium hydroxide, ammonia and various amines. In addition, the anionic polymer may be previously neutralized.

The degree of neutralization of the anionic group in the anionic polymer is preferably not less than 10 mol %, more preferably not less than 20 mol % and even more preferably not less than 30 mol % from the viewpoint of improving dispersion stability of the pigment-containing polymer particles in the ink, and is also preferably not more than 90 mol %, more preferably not more than 80 mol % and even more preferably not more than 70 mol % from the viewpoint of improving dispersibility of the pigment in the pigment water dispersion.

The degree of neutralization as used herein means the value calculated by dividing a mole equivalent amount of the neutralizing agent by a molar amount of the anionic group in the anionic polymer.

The degree of neutralization of the polymer is calculated according to the following formula:

Degree of neutralization(mol %)={[mass(g) of neutralizing agent/gram equivalent of neutralizing agent]/[acid value (mgKOH/g) of polymer× mass(g) of polymer/(56×1000)]}×100.

The acid value of the polymer may be calculated from the ratio between the monomer components used upon production of the polymer, or may also be determined by the method of subjecting a solution prepared by dissolving the polymer in a solvent capable of dissolving the polymer therein, such as methyl ethyl ketone, to titration with an alkaline agent.

The content of the pigment in the mixture used in the step (1) is preferably not less than 5% by mass and more preferably not less than 10% by mass, and is also preferably not more than 50% by mass and more preferably not more than 40% by mass from the viewpoint of enhancing productivity of the dispersion of the pigment-containing polymer particles. The content of the organic solvent in the mixture used in the step (1) is preferably not less than 0% by mass and more preferably not less than 10% by mass, and is also preferably not more than 70% by mass and more preferably not more than 50% by mass, from the viewpoint of enhancing productivity of the dispersion of the pigment-containing polymer particles.

The content of the anionic polymer in the mixture is preferably not less than 2% by mass and more preferably not less than 5% by mass, and is also preferably not more than 50% by mass and more preferably not more than 40% by mass, from the viewpoint of improving dispersion stability of the pigment-containing polymer particles in the ink.

The content of water in the mixture is preferably not less than 10% by mass and more preferably not less than 30% by mass, and is also preferably not more than 90% by mass and more preferably not more than 80% by mass, from the viewpoint of enhancing productivity of the dispersion of the pigment-containing polymer particles.

The mass ratio of the pigment to the anionic polymer [pigment/anionic polymer] is preferably from 50/50 to 90/10 and more preferably from 70/30 to 85/15 from the viewpoint of improving dispersion stability of the pigment-containing polymer particles in the ink.

In the step (1), the method of dispersing the mixture is not particularly limited. The pigment-containing anionic polymer particles may be atomized into fine particles having a desired average particle size only by a substantial dispersion treatment. Preferably, the mixture is first subjected to a preliminary dispersion treatment, and then to the substantial dispersion treatment by applying a shear stress thereto so as to control the average particle size of the obtained pigment-containing anionic polymer particles to a desired value.

The temperature used in the dispersion treatment in the step (1) is preferably not lower than 0° C. and more preferably not lower than 5° C., and is also preferably not higher than 50° C., more preferably not higher than 40° C. and even more preferably not higher than 35° C. The dispersing time is preferably not less than 1 hour and more preferably not less than 2 hours, and is also preferably not more than 30 hours, more preferably not more than 25 hours and even more preferably not more than 20 hours.

When subjecting the mixture to the preliminary dispersion treatment, there may be used ordinary mixing and stirring devices such as anchor blades and disper blades. Of these mixing and stirring devices, preferred are high-speed stirring mixers such as "Ultra Disper (tradename)" available from Asada Iron Works Co., Ltd., "Ebara Milder (tradename)" available from Ebara Corp., and "TK Homo Mixer (tradename)" available from Primix Corp.

As a means for applying a shear stress to the mixture in the substantial dispersion treatment, there may be used, for example, kneading machines such as roll mills, beads mills, kneaders and extruders, high-pressure dispersers, and media-type dispersers such as paint shakers and beads mills. These devices may be used in combination of any two or more thereof.

Among these devices, from the viewpoint of reducing the particle size of the pigment-containing anionic polymer particles, the dispers or the like are preferably used to conduct the preliminary dispersion treatment, followed by subjecting the resulting dispersion to the high-pressure dispersion treatment. The term "high-pressure dispersion" as used herein means that the dispersion treatment is conducted under a pressure of not less than 20 MPa.

The dispersing pressure is preferably not less than 50 MPa, more preferably not less than 100 MPa and even more preferably not less than 130 MPa, and is also preferably not more than 250 MPa and more preferably not more than 200 MPa, from the viewpoint of reducing the particle size of the pigment-containing polymer particles and attaining high dispersion treatment efficiency.

From the same viewpoint as described above, the number of passes of the dispersion through the disperser upon the high-pressure dispersion treatment is preferably not less than 2, more preferably not less than 4, even more preferably not less than 6 and further even more preferably not less than 8, and is also preferably not more than 20 and more preferably not more than 15.

As the high-pressure dispersers used in the present invention, there may be mentioned homo-valve-type high-pressure homogenizers such as typically "High-Pressure Homogenizer" (tradename) available from Izumi Food Machinery Co., Ltd., and "Mini-Labo 8.3H Model" (tradename) available from Rannie Corp., and chamber-type high-pressure homogenizers such as "Microfluidizer" (tradename) available from Microfluidics Corp., and "Nanomizer" (tradename) available from Nanomizer Inc.

The temperature of the dispersion used upon the high-pressure dispersion treatment is not particularly limited, and is preferably not lower than 5° C. and more preferably not lower than 10° C., and is also preferably not higher than 80° C. and more preferably not higher than 70° C.

[Step (2)]

In the step (2), the organic solvent is removed from the obtained dispersion by any known methods to obtain a water dispersion of the pigment-containing polymer particles (A). The organic solvent is preferably substantially completely removed from the thus obtained water dispersion containing the polymer particles (A). However, the residual organic solvent may be present in the water dispersion unless the objects and advantageous effects of the present invention are adversely affected by the residual organic solvent. The content of the residual organic solvent in the water dispersion is preferably not more than 0.1% by weight and more preferably not more than 0.01% by weight.

In addition, if required, the dispersion may be subjected to heating and stirring treatments before removing the organic solvent by distillation therefrom.

Examples of the apparatus used for removing the organic solvent in the step (2) include a thin film distillation apparatus such as a batch simple distillation device, a reduced pressure distillation device and a flush evaporator, a rotary distillation device and a stirring evaporator.

The temperature of the dispersion treatment product upon removing the organic solvent therefrom may be appropriately selected depending upon the kind of organic solvent used. The temperature of the dispersion treatment product upon removing the organic solvent therefrom under reduced pressure is preferably not lower than 20° C., more preferably not lower than 25° C. and even more preferably not lower than 30° C., and is also preferably not higher than 80° C., more preferably not higher than 70° C. and even more preferably not higher than 65° C.

The removal of the organic solvent is suitably conducted such that the concentration of the non-volatile components (solid components) in the dispersion obtained after removing the organic solvent therefrom is preferably not less than 18% by mass, more preferably not less than 20% by mass and even more preferably not less than 22% by mass, and is also preferably not more than 60% by mass, more preferably not more than 40% by mass and even more preferably not more than 35% by mass.

In the thus-obtained water dispersion of the pigment-containing polymer particles (A), the solid components of the pigment-containing polymer are dispersed in a medium containing water as a main medium. The configuration of the polymer particles (A) is not particularly limited, and the polymer particles (A) may have any configuration as long as the particles are formed of at least the pigment and the anionic polymer. Examples of the configuration of the polymer particles (A) include the particle configuration in which the pigment is enclosed in the polymer, the particle configuration in which the pigment is uniformly dispersed in the polymer, the particle configuration in which the pigment is exposed onto a surface of the respective polymer particles, as well as mixtures thereof.

The average particle size of the polymer particles (A) is preferably not less than 50 nm, more preferably not less than 70 nm, even more preferably not less than 80 nm and further even more preferably not less than 90 nm, and is also preferably not more than 200 nm, more preferably not more than 150 nm, even more preferably not more than 140 nm and further even more preferably not more than 130 nm, from the viewpoint of suppressing increase in viscosity of the ink when concentrated and improving rub fastness of the ink when printed on a recording medium.

Meanwhile, the average particle size of the polymer particles (A) may be measured by the method described in Examples below.

<Compound (B)>

The compound (B) contains one reactive group capable of reacting with the functional group of the pigment-containing polymer particles (A). It is preferred that the reactive group of the compound (B) is allowed to react with the functional group of the polymer particles (A) to form a covalent bond therebetween. As the covalent bond between the reactive group of the compound (B) and the functional group of the polymer particles (A), preferred is at least one bond selected from the group consisting of an ester bond, a thioester bond, an amide bond, an amino bond, an ether bond, a thioether bond, a carbonyl bond, a thiocarbonyl bond and a sulfonyl bond, and more preferred is at least one bond selected from the group consisting of an ester bond, a thioester bond and an amide bond. In particular, the polymer preferably contains a carboxy group, because the carboxy group undergoes accelerated irreversible addition reaction with a high yield by a thermal reaction with an epoxy group, a glycidyl group, an isocyanate group, an aziridino group, an amino group and an oxazoline group to form a covalent bond therebetween.

From the same viewpoint as described above, the reactive group of the compound (B) is preferably at least one group selected from the group consisting of an epoxy group, a glycidyl group, an isocyanate group, an aziridino group, an amino group and an oxazoline group. Among these reactive groups, from the viewpoint of improving cost efficiency, preferred is an epoxy group or a glycidyl group, and more preferred is an epoxy group. The reactive group of the compound (B) is not necessarily restricted to the aforementioned groups. However, if using compounds containing other reactive groups than the aforementioned groups, there tend to occur any limitation to the kinds of polymer and pigment usable in the present invention.

From the viewpoint of promoting adsorption of the polymer onto the surface of the pigment and thereby improving dispersion stability of the pigment in the dispersion, the compound (B) is preferably a compound containing at least one ether bond or a compound containing a constitutional unit of an alkylene glycol having not less than 2 and not more than 4 carbon atoms, more preferably a compound containing a constitutional unit of an alkylene glycol having 2 or 3 carbon atoms, and even more preferably a compound containing a constitutional unit of an alkylene glycol having 2 carbon atoms.

Examples of the alkyleneoxide capable of providing the constitutional unit of an alkylene glycol having not less than 2 and not more than 4 carbon atoms include ethyleneoxide, propyleneoxide and butyleneoxide. The number of the constitutional units of an alkylene glycol, i.e., a so-called average molar number of addition thereof, is preferably not less than 1, more preferably not less than 2, even more preferably not less than 3, further even more preferably not less than 5 and still further even more preferably not less than 7 from the viewpoint of suppressing increase in viscosity of the ink when the ink is being concentrated by evaporation of water therefrom, and is also preferably not more than 50, more preferably not more than 25, even more preferably not more than 20, further even more preferably not more than 15 and still further even more preferably not more than 12 from the viewpoint of reducing viscosity of the resulting ink.

The molecular weight of the compound (B) is preferably not less than 250, more preferably not less than 280 and even more preferably not less than 300, and is also preferably not more than 1200, more preferably not more than 1000, even more preferably not more than 950 and further even more preferably not more than 900, from the viewpoint of enhancing optical density of the ink including the resulting pigment water dispersion.

When the reactive group of the compound (B) is an epoxy group, the epoxy equivalent (g/eq) of the compound (B) is preferably not less than 90, more preferably not less than 150, even more preferably not less than 250, further even more preferably not less than 330, still further even more preferably not less than 380 and still further even more preferably not less than 420 from the viewpoint of suppressing increase in viscosity of the ink when the ink is being concentrated by evaporation of water therefrom, and is also preferably not more than 1600, more preferably not more than 1500, even more preferably not more than 1200, further even more preferably not more than 1000, still further even more preferably not more than 900 and still further even more preferably not more than 600 from the viewpoint of reducing viscosity of the resulting ink.

Meanwhile, the epoxy equivalent may be measured by the method described in Examples below.

Specific examples of the compound (B) containing an epoxy group or a glycidyl group include at least one glycidyl ether selected from the group consisting of methyl glycidyl ether, ethyl glycidyl ether, allyl glycidyl ether, 2-ethylhexyl glycidyl ether, phenyl glycidyl ether, tert-butylphenyl glycidyl ether, alkyl polyethyleneoxide glycidyl ethers, alkyl polypropyleneoxide glycidyl ethers, phenol polyethyleneoxide glycidyl ether, trimethylolpropane polyglycidyl ether, butoxy polyethyleneoxide glycidyl ether and polyethylene glycol diglycidyl ether, and an alkyleneoxide such as propyleneoxide, butyleneoxide, styrene oxide, cyclohexyleneoxide and 1-phenyl propyleneoxide.

Examples of commercially available products of the compound (B) include "DENACOL EX-145" (phenol polyethyleneoxide (5 mol) glycidyl ether), "DENACOL EX-171" (lauryl polyethyleneoxide (15 mol) glycidyl ether) and "DENACOL EX-321" (trimethylolpropane polyglycidyl ether) all available from Nagase ChemteX Corp., and "EPIOL BE-200" (butoxy polyethyleneoxide (4.5 mol) glycidyl ether) and "EPIOL B-1000" (polyethylene glycol diglycidyl ether; average number of addition of EO: 23) both available from NOF Corp.

<Production of Pigment-Containing Modified Polymer Particles>

The process for producing pigment-containing modified polymer particles according to the present invention includes the step of reacting the water dispersion of the pigment-containing polymer particles (A) obtained in the aforementioned steps (1) and (2) with the compound (B) in the medium.

The reaction between the polymer particles (A) and the compound (B) is conducted under such a condition that a ratio [(B)/(A)] of total moles of the reactive group of the compound (B) to total moles of the functional group of the polymer particles (A) is not less than 0.10 and not more than 0.62. The total moles of the functional group of the polymer particles (A) and the total moles of the reactive group of the compound (B) may be respectively calculated from the value as an index of the amount of each of the groups. For example, in the case where the functional group of the polymer particles (A) which is reacted with the reactive group of the compound (B) is an anionic group, the total moles of the functional group may be calculated from an acid value thereof. In the case where the reactive group of the compound (B) is an epoxy group, the total moles of the reactive group of the compound (B) may be calculated from an epoxy equivalent thereof.

The molar ratio [(B)/(A)] is preferably not less than 0.11, more preferably not less than 0.12, even more preferably not less than 0.15, further even more preferably not less than 0.20 and still further even more preferably not less than 0.28, and is also preferably not more than 0.60, more preferably not more than 0.55, even more preferably not more than 0.40 and further even more preferably not more than 0.35, from the viewpoint of suppressing increase in viscosity of the ink when the ink is being concentrated by evaporation of water therefrom by well bonding the compound (B) onto the surface of the polymer particles (A) to modify the polymer particles (A), from the viewpoint of improving dispersion stability of the pigment in the dispersion, and from the viewpoint of enhancing optical density of the ink including the obtained pigment water dispersion.

In the reaction between the polymer particles (A) and the compound (B), according to the modified polymer as desired, the catalyst, solvent, temperature, time ad reactor used therein may be appropriately determined such that the molar ratio [(B)/(A)] falls within the aforementioned range.

In addition, from the viewpoint of improving storage stability of the resulting ink and facilitating production of the ink, the compound (B) may be used together with a crosslinking agent containing two or more functional groups to introduce a crosslinking structure into the polymer. In particular, in the case of using a polymer having a molecular weight of about not more than 30,000 and an acid value of not less than 150 mgKOH/g as a dispersant, the polymer tends to be desorbed from the surface of the pigment owing to interaction with a vehicle of the ink. Therefore, in such a case, the polymer is preferably crosslinked in order to improve stability of the resulting ink.

The ink including the pigment-containing modified polymer particles has a low viscosity and is capable of suppressing increase in viscosity thereof when concentrated after water in the ink is evaporated, and therefore is excellent in ejection stability.

The amount of the compound (B) used is preferably not less than $0.7 \times 10^{-4}$ mol, more preferably not less than $1.0 \times 10^{-4}$ mol and even more preferably not less than $1.2 \times 10^{-4}$ mol, and is also preferably not more than $6.0 \times 10^{-4}$ mol, more preferably not more than $5.5 \times 10^{-4}$ mol, even more preferably not more than $5.0 \times 10^{-4}$ mol and further even more preferably not more than $3.0 \times 10^{-4}$ mol on the basis of 1 g of solid components (nonvolatile components) in the water dispersion of the pigment-containing polymer particles (A), from the viewpoint of reducing viscosity of the resulting ink and suppressing increase in viscosity thereof after concentrated.

In the case where the compound (B) contains an ethyleneoxide (EO) group, the number of EO groups per one molecule thereof is preferably not less than 1, more preferably not less than 2, even more preferably not less than 4 and further even more preferably not less than 6, and is also preferably not more than 23 and more preferably not more than 15, from the viewpoint of reducing viscosity of the resulting ink and suppressing increase in viscosity thereof after concentrated.

In the case where the compound (B) contains an epoxy group or a glycidyl group, the epoxy equivalent (g/eq) of the compound (B) is preferably not less than 90, more preferably not less than 150, even more preferably not less than 250, further even more preferably not less than 330, still further even more preferably not less than 380 and still further even more preferably not less than 420 from the same viewpoint as described above, and is also preferably not more than 1600, more preferably not more than 1500, even more preferably not more than 1200, further even more preferably not more than 1000, still further even more preferably not more than 900 and still further even more preferably not more than 600 from the viewpoint of reducing viscosity of the resulting ink.

The reaction between the polymer particles (A) and the compound (B) is preferably carried out in an aqueous medium. The aqueous medium as used herein means a medium containing water as a main component, i.e., a medium that preferably contains water in an amount of not less than 50% by mass, more preferably not less than 80% by mass, even more preferably not less than 90% by mass and further even more preferably 100% by mass. Examples of components other than water in the aqueous medium include alcohol solvents such as ethanol, isopropanol and isobutanol, ketone solvents such as acetone, methyl ethyl ketone, methyl isobutyl ketone and diethyl ketone, etc.

The temperature used in the reaction between the polymer particles (A) and the compound (B) is preferably not lower than 40° C. and more preferably not lower than 50° C., and is also preferably not higher than 100° C. and more preferably not higher than 95° C., from the viewpoint of high reaction efficiency. Also, the reaction time may vary depending upon the reaction temperature, etc., and is preferably not less than 0.5 hour and more preferably not less than 1.0 hour, and is also preferably not more than 10 hours and more preferably not more than 5 hours.

From the viewpoint of facilitating removal of coarse particles, the process for producing the pigment-containing modified polymer particles according to the present invention preferably includes the step of subjecting the resulting dispersion to filtration treatment using a filter after completion of the reaction. Since the pigment dispersion of the modified polymer particles obtained according to the process of the present invention is excellent in filterability, the filtration step is allowed to proceed with high efficiency, The mesh size of the filter used in the filtration step is preferably not more than 20 μm and more preferably not more than 10 μm from the viewpoint of facilitating removal of coarse particles, and is also preferably not less than 1 μm from the viewpoint of shortening the time required for the filtration treatment.

[Pigment Water Dispersion and Ink]

In the pigment water dispersion of the present invention, the modified polymer particles obtained by the production process of the present invention are dispersed in the aqueous medium.

The ink of the present invention is produced by compounding the pigment water dispersion of the modified polymer particles obtained by the aforementioned production process of the present invention, and at least one solvent selected from the group consisting of water and an organic solvent.

Examples of the organic solvent used in the ink include a polyhydric alcohol, a polyhydric alcohol alkyl ether, a polyhydric alcohol alkyl ether acetate and a nitrogen-containing heterocyclic compound.

Examples of the polyhydric alcohol include ethylene glycol, diethylene glycol, propylene glycol, 1,2-hexanediol, 1,3-hexanediol, 1,6-hexanediol, triethylene glycol, glycerin and 2-butyl-2-ethyl-1,3-propanediol. Among these polyhydric alcohols, from the viewpoint of improving rub fastness of the printed characters or images, preferred are diethylene glycol, propylene glycol, glycerin and 2-butyl-2-ethyl-1,3-propanediol.

Examples of the polyhydric alcohol alkyl ether include diethylene glycol monoalkyl ethers and triethylene glycol monoalkyl ethers. Among these polyhydric alcohol alkyl ethers, from the viewpoint of improving rub fastness of the printed characters or images, preferred are diethylene glycol monoisobutyl ether and triethylene glycol monobutyl ether.

Examples of the polyhydric alcohol alkyl ether acetate include propylene glycol monomethyl ether acetate (PGMEA) and diethylene glycol monobutyl ether acetate (BCA). Examples of the nitrogen-containing heterocyclic compound include N-methyl-2-pyrrolidone and 2-pyrrolidone.

These organic solvents may be used alone or in combination of any two or more thereof.

In the process for producing the ink, various properties of the ink such as concentration, viscosity and wettability may be respectively controlled to desired values. In addition, the ink may also be produced by further adding, in addition to the aforementioned water and organic solvent, various ordinary additives for inks such as a humectant, a wetting agent, a penetrant, a dispersant, a surfactant, a viscosity controller, a defoaming agent, an antiseptic agent, a mildew-proof agent and a rust preventive to the pigment water dispersion.

Also, the ink may be further subjected, if required, to filtration to remove large-size impurities that tend to cause clogging, etc., upon ink-jet printing, and heat treatments.

(Contents of Respective Components in Ink)

The content of the pigment in the ink such as an ink for ink-jet printing is preferably not less than 1% by mass, more preferably not less than 2% by mass and even more preferably not less than 3% by mass, and is also preferably not more than 20% by mass, more preferably not more than 15% by mass and even more preferably not more than 12% by mass, from the viewpoint of enhancing optical density of the printed characters or images.

The content of the polymer in the ink is preferably not less than 1% by mass, more preferably not less than 2% by mass, even more preferably not less than 4% by mass and further even more preferably not less than 6% by mass, and is also preferably not more than 30% by mass, more preferably not more than 20% by mass and even more preferably not more than 15% by mass, from the viewpoint of improving rub fastness of the printed characters or images.

The solid content of the ink is preferably not less than 2% by mass, more preferably not less than 3% by mass and even more preferably not less than 5% by mass from the viewpoint of obtaining an ink having high optical density, and is also preferably not more than 30% by mass, more preferably not more than 20% by mass and even more preferably not more than 15% by mass from the viewpoint of improving dispersion stability of the ink. Meanwhile, the solid content of the ink may be measured by the method described in Examples below.

The content of water in the ink is preferably not less than 20% by mass, more preferably not less than 30% by mass and even more preferably not less than 40% by mass from the viewpoint of obtaining the printed characters or images having excellent rub fastness, and is also preferably not more than 70% by mass, more preferably not more than 65% by mass and even more preferably not more than 60% by mass from the viewpoint of improving ejection properties of the ink.

The mass ratio of the pigment to the polymer [pigment/polymer] in the ink is preferably not less than 0.1, more preferably not less than 0.2 and even more preferably not less than 0.4, and is also preferably not more than 4.0, more preferably not more than 2.0 and even more preferably not more than 1.0, from the viewpoint of obtaining the printed characters or images having excellent rub fastness.

(Properties of Ink)

The average particle size of the polymer particles (A) in the ink is preferably not less than 50 nm, more preferably not less than 70 nm, even more preferably not less than 80 nm and further even more preferably not less than 90 nm, and is also preferably not more than 200 nm, more preferably not more than 150 nm, even more preferably not more than 140 nm and further even more preferably not more than 130 nm, from the viewpoint of suppressing increase in viscosity thereof when concentrated and improving rub fastness of the printed characters or images when printed on a recording medium.

Meanwhile, the average particle size of the polymer particles (A) may be measured by the method described in Examples below.

The viscosity of the ink as measured at 20° C. is preferably not less than 4 mPa·s, more preferably not less than 6 mPa·s and even more preferably not less than 8 mPa·s, and is also preferably not more than 20 mPa·s, more preferably not more than 15 mPa·s and even more preferably not more than 13 mPa·s, from the viewpoint of improving storage stability of the ink and rub fastness of the printed characters or images.

Meanwhile, the viscosity at 20° C. of the ink may be measured by the method described in Examples below.

The viscosity of the ink as measured at 32° C. after the ink has been concentrated by evaporation of water from the ink is preferably not more than 700 mPa·s, more preferably not more than 600 mPa·s, even more preferably not more than 500 mPa·s, further even more preferably not more than 400 mPa·s, still further even more preferably not more than 300 mPa·s, still further even more preferably not more than 200 mPa·s and still further even more preferably not more than 150 mPa·s from the viewpoint of attaining good long-term ejection stability of the ink. Also, from the viewpoint of improving quality of images printed on a recording medium, the viscosity of the ink as measured at 32° C. after the ink has been concentrated by evaporation of water from the ink is preferably not less than 8 mPa·s and more preferably not less than 50 mPa·s.

Meanwhile, the viscosity of the ink as measured at 32° C. after the ink has been concentrated by evaporation of water from the ink may be measured by the method described in Examples below.

The static surface tension of the ink as measured at 20° C. is preferably not less than 20 mN/m and more preferably not less than 25 mN/m, and is also preferably not more than 50 mN/m, more preferably not more than 40 mN/m and even more preferably not more than 35 mN/m, from the viewpoint of improving ejection properties of the ink. Meanwhile, the static surface tension at 20° C. of the ink may be measured by the method described in Examples below.

The pH value of the ink is preferably not less than 7.0, more preferably not less than 7.5 and even more preferably not less than 8.0 from the viewpoint of improving storage stability of the ink and improving rub fastness of the printed characters or images, and is also preferably not more than 11.0, more preferably not more than 10.0 and even more preferably not more than 9.5 from the viewpoint of improving resistance of members to the ink and suppressing skin irritation.

The ink according to the present invention may be suitably used in an ink-jet printing method in which characters or images are printed on a recording medium such as a plain paper or an ink-jet paper. In addition, the ink may also be suitably used in an ink-jet printing method in which characters or images are printed on a low-water absorbing recording medium such as a coated paper and a synthetic resin film, because of excellent rub fastness of the ink.

With respect to the aforementioned embodiments, the present invention further provides the following aspects relating to the process for producing the pigment-containing modified polymer particles, the pigment water dispersion including the modified polymer particles produced by the process, and the ink including the pigment water dispersion.

<1> A process for producing pigment-containing modified polymer particles, including the step of:

reacting pigment-containing polymer particles (A) containing a functional group and a compound (B) containing a reactive group capable of reacting with the functional group of the polymer particles (A) in a medium under such a condition that a ratio [(B)/(A)] of total moles of the reactive group of the compound (B) to total moles of the functional group of the polymer particles (A) is not less than 0.10 and not more than 0.62.

<2> The process for producing the modified polymer particles according to the above aspect <1>, wherein the polymer constituting the polymer particles (A) is an anionic polymer.

<3> The process for producing the modified polymer particles according to the above aspect <2>, wherein the polymer is an anionic vinyl-based polymer.

<4> The process for producing the modified polymer particles according to the above aspect <3>, wherein the anionic vinyl-based polymer contains a constitutional unit derived from an anionic monomer (a), a constitutional unit derived from a hydrophobic monomer (b) and a constitutional unit derived from a macromer (c).

<5> The process for producing the modified polymer particles according to the above aspect <4>, wherein a content of the component (a) is preferably not less than 2% by mass, more preferably not less than 5% by mass and even more preferably not less than 10% by mass, and is also preferably not more than 40% by mass, more preferably not more than 30% by mass and even more preferably not more than 25% by mass.

<6> The process for producing the modified polymer particles according to the above aspect <4> or <5>, wherein a content of the component (b) is preferably not less than 30% by mass, more preferably not less than 40% by mass and even more preferably not less than 50% by mass, and is also preferably not more than 90% by mass, more preferably not more than 80% by mass and even more preferably not more than 70% by mass.

<7> The process for producing the modified polymer particles according to any one of the above aspects <4> to <6>, wherein a content of the component (c) is preferably not less than 2% by mass, more preferably not less than 4% by mass and even more preferably not less than 6% by mass, and is also preferably not more than 30% by mass, more preferably not more than 25% by mass and even more preferably not more than 20% by mass.

<8> The process for producing the modified polymer particles according to any one of the above aspects <4> to <7>, wherein a mass ratio of the component (a) to a sum of the component (b) and the component (c) [component (a)/[component (b)+component (c)]] is preferably not less than 0.02, more preferably not less than 0.05 and even more preferably not less than 0.10, and is also preferably not more than 0.8, more preferably not more than 0.6 and even more preferably not more than 0.4.

<9> The process for producing the modified polymer particles according to any one of the above aspects <1> to <8>, wherein a mass ratio of the pigment to the anionic polymer [pigment/anionic polymer] in the pigment-containing polymer particles (A) is preferably from 50/50 to 90/10 and more preferably from 70/30 to 85/15.

<10> The process for producing the modified polymer particles according to any one of the above aspects <1> to <9>, wherein an average particle size of the pigment-containing polymer particles (A) is preferably not less than 50 nm, more preferably not less than 70 nm, even more preferably not less than 80 nm and further even more preferably not less than 90 nm, and is also preferably not more than 200 nm, more preferably not more than 150 nm, even more preferably not more than 140 nm and further even more preferably not more than 130 nm.

<11> The process for producing the modified polymer particles according to any one of the above aspects <1> to <10>, wherein the medium is an aqueous medium.

<12> The process for producing the modified polymer particles according to any one of the above aspects <1> to <11>, wherein the reactive group of the compound (B) is at least one group selected from the group consisting of an epoxy group, a glycidyl group, an isocyanate group, an aziridino group, an amino group and an oxazoline group, preferably an epoxy group or a glycidyl group, and more preferably an epoxy group.

<13> The process for producing the modified polymer particles according to any one of the above aspects <1> to <12>, wherein the compound (B) is a compound containing at least one ether bond, preferably a compound containing a constitutional unit of an alkylene glycol having not less than 2 and not more than 4 carbon atoms, more preferably a compound containing a constitutional unit of an alkylene glycol having 2 or 3 carbon atoms, and even more preferably a compound containing a constitutional unit of an alkylene glycol having 2 carbon atoms.

<14> The process for producing the modified polymer particles according to any one of the above aspects <1> to <13>, wherein the compound (B) contains a constitutional unit of an alkylene glycol having not less than 2 and not more than 4 carbon atoms.

<15> The process for producing the modified polymer particles according to any one of the above aspects <1> to <14>, wherein the compound (B) is at least one glycidyl ether selected from the group consisting of methyl glycidyl ether, ethyl glycidyl ether, allyl glycidyl ether, 2-ethylhexyl glycidyl ether, phenyl glycidyl ether, tert-butylphenyl glycidyl ether, alkyl polyethyleneoxide glycidyl ethers, alkyl polypropyleneoxide glycidyl ethers, phenol polyethyleneoxide glycidyl ether, trimethylolpropane polyglycidyl ether, butoxy polyethyleneoxide glycidyl ether and polyethylene glycol diglycidyl ether.

<16> The process for producing the modified polymer particles according to any one of the above aspects <1> to <15>, wherein a molecular weight of the compound (B) is preferably not less than 250, more preferably not less than 280 and even more preferably not less than 300, and is also preferably not more than 1200, more preferably not more than 1000, even more preferably not more than 950 and further even more preferably not more than 900.

<17> The process for producing the modified polymer particles according to any one of the above aspects <1> to <16>, wherein the functional group of the polymer particles (A) is at least one group selected from the group consisting of a carboxy group, a sulfonic group and a phosphoric group.

<18> The process for producing the modified polymer particles according to any one of the above aspects <1> to <17>, wherein the functional group of the polymer particles (A) is a carboxy group, and the reactive group of the compound (B) is an epoxy group or a glycidyl group.

<19> The process for producing the modified polymer particles according to any one of the above aspects <1> to <18>, wherein the reactive group of the compound (B) is an epoxy group, and an epoxy equivalent (g/eq) of the compound (B) is preferably not less than 90, more preferably not less than 150, even more preferably not less than 250, further even more preferably not less than 330, still further even more preferably not less than 380 and still further even more preferably not less than 420, and is also preferably not more than 1600, more preferably not more than 1500, even more preferably not more than 1200, further even more preferably not more than 1000, still further even more preferably not more than 900 and still further even more preferably not more than 600.

<20> The process for producing the modified polymer particles according to any one of the above aspects <1> to <19>, wherein a molar ratio [(B)/(A)] of the reactive group of the compound (B) to the functional group of the polymer particles (A) is preferably not less than 0.11, more preferably not less than 0.12, even more preferably not less than 0.15, further even more preferably not less than 0.20 and still further even more preferably not less than 0.28, and is also preferably not more than 0.60, more preferably not more than 0.55, even more preferably not more than 0.40 and further even more preferably not more than 0.35.

<21> The process for producing the modified polymer particles according to any one of the above aspects <1> to <20>, wherein an amount of the compound (B) used is preferably not less than $0.7 \times 10^{-4}$ mol, more preferably not less than $1.0 \times 10^{-4}$ mol and even more preferably not less than $1.2 \times 10^{-4}$ mol, and is also preferably not more than $6.0 \times 10^{-4}$ mol, more preferably not more than $5.5 \times 10^{-4}$ mol, even more preferably not more than $5.0 \times 10^{-4}$ mol and further even more preferably not more than $3.0 \times 10^{-4}$ mol on the basis of 1 g of solid components (nonvolatile components) in the water dispersion of the pigment-containing polymer particles (A).

<22> The process for producing the modified polymer particles according to any one of the above aspects <1> to <21>, wherein in the case where the compound (B) contains an ethyleneoxide (EO) group, the number of EO groups per one molecule thereof is preferably not less than 1, more preferably not less than 2, even more preferably not less than 4 and further even more preferably not less than 6, and is also preferably not more than 23 and more preferably not more than 15.

<23> The process for producing the modified polymer particles according to any one of the above aspects <1> to <22>, wherein in the case where the compound (B) contains an epoxy group or a glycidyl group, the epoxy equivalent (g/eq) of the compound (B) is preferably not less than 90, more preferably not less than 150, even more preferably not less than 250, further even more preferably not less than 330, still further even more preferably not less than 380 and still further even more preferably not less than 420, and is also preferably not more than 1600, more preferably not more than 1500, even more preferably not more than 1200, further even more preferably not more than 1000, still further even more preferably not more than 900 and still further even more preferably not more than 600.

<24> The process for producing the modified polymer particles according to any one of the above aspects <1> to <23>, wherein a temperature used in the reaction between the polymer particles (A) and the compound (B) is preferably not lower than 40° C. and more preferably not lower than 50° C., and is also preferably not higher than 100° C. and more preferably not higher than 95° C.

<25> A pigment water dispersion including an aqueous medium and the modified polymer particles produced by the process according to any one of the above aspects <1> to <24> which are dispersed in the aqueous medium.

<26> An ink including the pigment water dispersion according to the above aspect <25>, and at least one solvent selected from the group consisting of water and an organic solvent.

<27> The ink according to the above aspect <26>, wherein the organic solvent used in the ink is at least one solvent selected from the group consisting of a polyhydric alcohol, a polyhydric alcohol alkyl ether, a polyhydric alcohol alkyl ether acetate and a nitrogen-containing heterocyclic compound.

<28> The ink according to the above aspect <27>, wherein the polyhydric alcohol is at least one compound selected from the group consisting of ethylene glycol, diethylene glycol, propylene glycol, 1,2-hexanediol, 1,3-hexanediol, 1,6-hexanediol, triethylene glycol, glycerin and 2-butyl-2-ethyl-1,3-propanediol, and preferably at least one compound selected from the group consisting of diethylene glycol, propylene glycol, glycerin and 2-butyl-2-ethyl-1,3-propanediol.

<29> The ink according to the above aspect <27> or <28>, wherein the polyhydric alcohol alkyl ether is at least one compound selected from the group consisting of diethylene glycol monoalkyl ethers and triethylene glycol monoalkyl ethers, and preferably at least one compound selected from the group consisting of diethylene glycol monoisobutyl ether and triethylene glycol monobutyl ether.

<30> The ink according to any one of the above aspects <27> to <29>, wherein the polyhydric alcohol alkyl ether acetate is at least one compound selected from the group consisting of propylene glycol monomethyl ether acetate and diethylene glycol monobutyl ether acetate, and the nitrogen-containing heterocyclic compound is at least one compound selected from the group consisting of N-methyl-2-pyrrolidone and 2-pyrrolidone.

<31> The ink according to any one of the above aspects <26> to <30>, wherein a content of the pigment in the ink is preferably not less than 1% by mass, more preferably not less than 2% by mass and even more preferably not less than 3% by mass, and is also preferably not more than 20% by mass, more preferably not more than 15% by mass and even more preferably not more than 12% by mass.

<32> The ink according to any one of the above aspects <26> to <31>, wherein a viscosity of the ink as measured at 20° C. is preferably not less than 4 mPa·s, more preferably not less than 6 mPa·s and even more preferably not less than 8 mPa·s, and is also preferably not more than 20 mPa·s, more preferably not more than 15 mPa·s and even more preferably not more than 13 mPa·s, and the ink is used for ink-jet printing.

<33> The ink according to any one of the above aspects <26> to <32>, wherein a viscosity of the ink as measured at 32° C. after the ink has been concentrated by evaporation of water from the ink is preferably not more than 700 mPa·s, more preferably not more than 600 mPa·s, even more preferably not more than 500 mPa·s, further even more preferably not more than 400 mPa·s, still further even more preferably not more than 300 mPa·s, still further even more preferably not more than 200 mPa·s and still further even more preferably not more than 150 mPa·s, and is also preferably not less than 8 mPa·s and more preferably not less than 50 mPa·s.

<34> A use of the ink according to any one of the above aspects <26> to <33>, for ink-jet printing.

EXAMPLES

In the following Production Examples, Examples and Comparative Examples, the "part(s)" and "%" indicate "part(s) by mass" and "% by mass", respectively, unless otherwise specified. Meanwhile, various properties or characteristics were measured and evaluated by the following methods.

(1) Measurement of Weight-Average Molecular Weight of Polymer

The weight-average molecular weight of the polymer was measured by gel permeation chromatography using "G4000HXL+G2000HXL" as columns available from Tosoh Corporation as well as tetrahydrofuran (THF) containing 50 mM of acetic acid (extra pure reagent) as an eluent, and further using polystyrene as a reference standard substance.

(2) Measurement of Average Particle Size of Polymer Particles (A) in Ink

The average particle size of the polymer particles was measured using a laser particle analyzing system "ELS-8000" (cumulant analysis) available from Otsuka Electronics Co., Ltd. The measurement was conducted at a temperature of 25° C., an angle between incident light and a detector of 90° and a cumulative number of 100 times, and a refractive index of water (1.333) was input to the analyzing system as a refractive index of the dispersing medium. In the measurement, the concentration of the particles in the dispersion was usually about $5 \times 10^{-3}$% by mass.

(3) Measurement of Solid Contents of Water Dispersion and Ink

Using an infrared moisture meter "FD-230" (tradename) available from Kett Electric Laboratory, 5 g of a water dispersion was dried at a drying temperature of 150° C. under a measuring mode 96 (monitoring time: 2.5 min/variation range: 0.05%) to measure a water content on a wet base (% by mass) thereof. The solid content of the water dispersion was calculated according to the following formula:

Solid Content(% by weight)=100−(water content on a wet base(% by mass) of water dispersion)

(4) Measurement of Epoxy Equivalent

The epoxy equivalent of each of the compounds (B) obtained in Synthesis Examples 1 to 4 below was measured by a potentiometric titration method using an automatic potentiometric titration device "AT-610" available from Kyoto Electronics Co., Ltd., according to JIS K7236.

(5) Measurement of Viscosity of Ink

The viscosity of the ink was measured at 20° C. for 1 minute using an E-type viscometer equipped with a standard rotor (1°34'×R24) available from Toki Sangyo Co., Ltd., under the condition that the device was operated at maximum rotating speed being allowable for the ink in the device among a rotating speed range of 20 to 100 rpm.

(6) Measurement of Viscosity of Ink After Being Concentrated

One hundred grams of the ink prepared were charged into a glass reaction vessel, and water in the ink was volatilized therefrom until the mass of the ink was reduced to 60 g to thereby dry the ink. The viscosity of the ink after being concentrated by drying was measured at 32° C. for 1 minute using an E-type viscometer equipped with a standard rotor (1°34'×R24) available from Toki Sangyo Co., Ltd., under the condition that the device was operated at maximum rotating speed being allowable for the ink in the device among a rotating speed range of 0.5 to 100 rpm.

(7) Production of Ink-Jet Printed Material

The ink obtained in the respective Examples and Comparative Examples was loaded into a commercially available ink-jet printer "GX-2500" (piezoelectric type) available from Ricoh Co., Ltd., and A4 size (monochrome) solid image printing was carried out on an A4 size lightweight coated paper "Ziegler Evolution" (tradename; basis weight: 90 g/m$^2$) available from Ziegler Corporation at 23° C. and a relative humidity of 50% under the printing condition of "glossy coated paper; Clean; no color matching". After completion of the printing, the resulting printed material was allowed to stand at room temperature for 24 hours and dried, thereby obtaining a printed material for evaluation of rub fastness.

(8) Evaluation for Rub Fastness of Printed Material

A lightweight coated paper "Ziegler Evolution" (tradename; basis weight: 90 g/m$^2$) available from Ziegler Corporation was attached onto a bottom surface of a 460-g weight (1 inch×1 inch) using a double-sided adhesive tape.

Next, the weight was placed on a printed surface of the respective printed materials obtained in Examples and Comparative Examples such that the lightweight coated paper attached on the bottom surface of the weight was brought into contact with the printed surface, and reciprocatively moved thereover 5 times to rub a solid image-printed portion of the printed surface in the range of a 4-inch width thereof. The thus rubbed printed materials were observed by naked eyes to evaluate rub fastness thereof according to the following evaluation ratings.

<Evaluation Ratings>

A: No flaws were recognized when observed by naked eyes.
B: Flaws were recognized when observed by naked eyes, but no surface of the recoding paper was exposed outside.
C: Flaws were recognized when observed by naked eyes, and the surface of the rubbed portion of the recoding paper in was partially exposed outside.
D: The surface of the rubbed portion of the recoding paper was wholly exposed outside.

(9) Evaluation for Filterability of Water Dispersion

The filterability of the water dispersion was evaluated by an amount of the water dispersion being passed through one 5 μm filter (cellulose acetate membrane) available from Sartorius Inc., at the time of termination of the step (II) (in the case where no step (II) was conducted, at the time of termination of the step (I)).

<Evaluation Ratings>

A: Not less than 100 mL
B: Not less than 20 mL and less than 100 mL
C: Not less than 2 mL and less than 20 mL
D: Less than 2 mL Production Examples 1 to 3 (Production of Polymer Solutions)

Two hundred grams of methyl ethyl ketone (MEK), 0.3 g of a chain transfer agent (2-mercaptoethanol) and 200 g of a monomer mixture containing respective components at a mass ratio shown in Table 1 were charged into a reaction vessel and mixed with each other, and then an inside atmosphere of the reaction vessel was fully replaced with a nitrogen gas to thereby obtain a mixed solution.

Separately, 1800 g of the monomer mixture containing respective components at a mass ratio shown in Table 1, 0.27 g of the chain transfer agent, 600 g of MEK and 12 g of a radical polymerization initiator [2,2'-azobis(2,4-dimethylvaleronitrile)] were charged into a dropping funnel and mixed with each other, and an inside atmosphere of the dropping funnel was fully replaced with a nitrogen gas to thereby obtain a mixed solution.

The mixed solution in the reaction vessel was heated to 65° C. while stirring in a nitrogen atmosphere, and then the mixed solution in the dropping funnel was added dropwise thereinto over 3 hours. After completion of the dropping, the resulting reaction solution was stirred at 65° C. for 2 hours, and a solution prepared by dissolving 3 g of the radical polymerization initiator in 50 g of MEK was added to the reaction solution. The obtained reaction mixture was further stirred at 65° C. for 2 hours and then at 70° C. for 2 hours, and MEK was added to the reaction vessel such that the solid content of the resulting reaction solution therein was 40% by weight, followed by further stirring the reaction solution for 30 minutes, thereby obtaining a polymer solution (solid content: 40% by weight).

A part of each of the thus obtained solutions of the water-insoluble polymers 1 to 3 was dried under reduced pressure at 105° C. for 2 hours to remove the solvent therefrom and isolate each of the water-insoluble polymers 1 to 3 therefrom. The weight-average molecular weight of the respective polymers thus isolated was measured. The results are shown in Table 1.

Meanwhile, the numeral values for the respective monomers shown in Table 1 indicate parts by weight of active ingredients thereof.

AS-6S: Styrene macromer available from Toagosei Co., Ltd.; tradename: "AS-6S"; number-average molecular weight: 6000; polymerizable functional group: methacryloyloxy group NM-95: Styrene-based macromer containing a polymerizable functional group at one terminal end thereof produced by the following production process; number-average molecular weight: 3200; polymerizable functional group: methacryloyloxy group (Production of Styrene-Based Macromer Containing Polymerizable Functional Group at One Terminal End thereof)

Twenty five parts by weight of toluene, 50 parts by weight of styrene and 1 part by weight of mercaptopropionic acid were charged into a reaction vessel and mixed with each other, and then an inside atmosphere of the reaction vessel was replaced with a nitrogen gas to thereby obtain a mixed solution.

Separately, 60 parts by weight of toluene, 200 parts by weight of styrene and 4 parts by weight of mercaptopropionic acid as well as a solution prepared by dissolving 2 parts by weight of 4,4-azobis(4-cyanovaleric acid) in 40 parts by weight of ethanol were charged into a dropping funnel 1 and mixed with each other, and an inside atmosphere of the dropping funnel 1 was replaced with a nitrogen gas to thereby obtain a mixed solution. Also, 20 parts by weight of toluene and 1.2 parts by weight of mercaptopropionic acid as well as a solution prepared by dissolving 1 part by weight of 4,4-azobis(4-cyanovaleric acid) in 40 parts by weight of ethanol were charged into a dropping funnel 2 and mixed with each other, and an inside atmosphere of the dropping funnel 2 was replaced with a nitrogen gas to thereby obtain a mixed solution.

The mixed solution in the reaction vessel was heated to 90° C. while stirring in a nitrogen atmosphere, and then the mixed solution in the dropping funnel 1 was gradually added dropwise thereinto over 4 hours, and then the mixed solution in the dropping funnel 2 was gradually added dropwise thereinto over 4 hours. The resulting reaction solution was further aged at 95° C. for 1 hour, thereby obtaining a styrene-based macromer solution.

M-40G: Polyethylene glycol monomethacrylate (average molar number of addition of ethyleneoxide: 9; end group: methyl group) available from Shin-Nakamura Chemical Co., Ltd.; tradename: "NK ESTER M-40G"

Stearyl methacrylate: Available from Shin-Nakamura Chemical Co., Ltd.; tradename: "NK ESTER S"

PP-800: Polypropylene glycol monomethacrylate (average molar number of addition of propyleneoxide (PO): 13; end group: hydroxy group) available from NOF Corporation; tradename: "BLEMMER PP-800"

PP-1000: Polypropylene glycol monomethacrylate (average molar number of addition of PO: 16; end group: hydroxy group) available from NOF Corporation; tradename: "BLEMMER PP-1000"

43PAPE600B: Phenoxy(polyethylene glycol/polypropylene glycol) monomethacrylate (average molar number of addition of ethyleneoxide (EO): 6; average molar number of addition of PO; 6; end group: phenyl group) available from NOF Corporation; tradename: "BLEMMER 43PAPE600B"

Synthesis Example 2 (Synthesis of Compound (B2))

A solution prepared by dissolving 24.4 g (0.1 mol) of "DENACOL EX-850" (diethylene glycol diglycidyl ether; epoxy equivalent: 122 g/eq.; number of epoxy groups: 2; average number of addition of EO: 2) available from Nagase ChemteX Corporation in 20 mL of acetone was heated to 50° C. After heating the solution to 50° C., a solution prepared by dissolving 3.4 g (0.05 mol) of sodium ethoxide available from Wako Pure Chemical Industries, Ltd., in 12 mL of ethanol was added dropwise thereto over 20 minutes. The resulting reaction solution was further stirred at 50° C. for 10 minutes, and then neutralized with acetic acid. After removing the solvent by distillation from the obtained reaction solution, the reaction solution was allowed to stand in a vacuum dryer at room temperature for 48 hours, thereby obtaining a compound (B2) containing one functional group.

The thus obtained compound (B2) had an epoxy equivalent of 300.

Synthesis Example 3 (Synthesis of Compound (B3))

A solution prepared by dissolving 26.8 g (0.05 mol) of "DENACOL EX-830" (polyethylene glycol diglycidyl ether; epoxy equivalent: 268 g/eq.; number of epoxy groups: 2; average number of addition of EO: 9) available from

TABLE 1

|  |  | Production Example 1<br>Polymer 1 | Production Example 2<br>Polymer 2 | Production Example 3<br>Polymer 3 |
|---|---|---|---|---|
| Monomer components | (a) Methacrylic acid (MAA) | 13 | 14 | 16 |
|  | (b) Styrene monomer |  | 46 | 44 |
|  | (b) Benzyl methacrylate | 47 |  |  |
|  | (b) Stearyl methacrylate | 10 |  |  |
|  | (c) AS-6S |  | 15 | 15 |
|  | (c) NM-95 | 10 |  |  |
|  | (d) BLEMMER PP-800 | 10 |  |  |
|  | (d) BLEMMER PP-1000 |  | 25 | 0.5 |
|  | (d) BLEMMER 43PAPE-600B | 10 |  |  |
|  | (d) NK ESTER M-40G |  |  | 24.5 |
| Weight-average molecular weight |  | 160,000 | 51,000 | 50,000 |

Synthesis Example 1 (Synthesis of Compound (B1))

A solution prepared by dissolving 22.6 g (0.1 mol) of "DENACOL EX-810" (ethylene glycol diglycidyl ether; epoxy equivalent: 113 g/eq.; number of epoxy groups: 2; average number of addition of EO: 1) available from Nagase ChemteX Corporation in 20 mL of acetone was heated to 50° C. After heating the solution to 50° C., a solution prepared by dissolving 3.4 g (0.05 mol) of sodium ethoxide available from Wako Pure Chemical Industries, Ltd., in 12 mL of ethanol was added dropwise thereto over 20 minutes. The resulting reaction solution was further stirred at 50° C. for 10 minutes, and then neutralized with acetic acid. After removing the solvent by distillation from the obtained reaction solution, the reaction solution was allowed to stand in a vacuum dryer at room temperature for 48 hours, thereby obtaining a compound (B1) containing one functional group.

The thus obtained compound (B1) had an epoxy equivalent of 230.

Nagase ChemteX Corporation in 20 mL of acetone was heated to 50° C. After heating the solution to 50° C., a solution prepared by dissolving 1.7 g (0.025 mol) of sodium ethoxide available from Wako Pure Chemical Industries, Ltd., in 12 mL of ethanol was added dropwise thereto over 20 minutes. The resulting reaction solution was further stirred at 50° C. for 10 minutes, and then neutralized with acetic acid. After removing the solvent by distillation from the obtained reaction solution, the reaction solution was allowed to stand in a vacuum dryer at room temperature for 48 hours, thereby obtaining a compound (B3) containing one functional group.

The thus obtained compound (B3) had an epoxy equivalent of 550.

Synthesis Example 4 (Synthesis of Compound (B4))

A solution prepared by dissolving 34 g (0.025 mol) of "EPIOL E-1000" (polyethylene glycol diglycidyl ether; epoxy equivalent: 680 g/eq.; number of epoxy groups: 2; average number of addition of EO: 23) available from NOF Corporation in 20 mL of acetone was heated to 50° C. After heating the solution to 50° C., a solution prepared by dissolving 0.85 g (0.0125 mol) of sodium ethoxide available from Wako Pure Chemical Industries, Ltd., in 12 mL of ethanol was added dropwise thereto over 20 minutes. The resulting reaction solution was further stirred at 50° C. for 10 minutes, and then neutralized with acetic acid. After removing the solvent by distillation from the obtained reaction solution, the reaction solution was allowed to stand in a vacuum dryer at room temperature for 48 hours, thereby obtaining a compound (B4) containing one functional group.

The thus obtained compound (B4) had an epoxy equivalent of 1350.

Example 1

<Step (I): Production of Water Dispersion of Pigment-Containing Polymer Particles (A)>

One hundred twenty nine grams of the polymer 1 solution obtained in Production Example 1 (solid content: 40% by mass) were dissolved in 117 g of MEK, and 11.1 g of a 5 N (16.8% by mass) sodium hydroxide aqueous solution and 578 g of ion-exchanged water were added to the resulting solution, and then the obtained mixture was stirred at 15° C. using a disper "T.K. Homodisper 40 Model" (diameter: 0.11 m; hereinafter also referred to merely as a "disper") available from Primix Corporation at 1400 rpm for 10 minutes.

The resulting reaction mixture was mixed with 120 g of a magenta pigment (PR122) "CFR6114JC" available from Dainichiseika Color & Chemicals Mfg. Co., Ltd., and stirred at 15° C. using the disper at 6400 rpm for 1 hour, thereby obtaining a mixed solution. Next, the mixed solution was subjected to dispersion treatment at 15° C. under a pressure of 150 MPa by allowing the solution to pass through "MICROFLUIDIZER" available from Microfluidics Corp., 10 times, thereby obtaining a dispersion. Thereafter, the resulting dispersion was held at 60° C. under reduced pressure to remove MEK and a part of water therefrom. Furthermore, the obtained dispersion was subjected to centrifugal separation and then to filtration using a 5 μm filter (cellulose acetate membrane) available from Sartorius Inc., thereby obtaining a water dispersion of pigment-containing polymer particles (A) having a nonvolatile content of 26% by mass (as a total content of polymer 1+pigment).

<Step (II)>

Added and mixed in 300 g of the water dispersion obtained in the aforementioned step (I) were 4.68 g (1.5× $10^{-4}$ mol based on 1 g of the nonvolatile components in the dispersion obtained in the step (I)) of "EX-145" (phenol polyethyleneoxide (5 mol) glycidyl ether; epoxy equivalent: 400) available from Nagase ChemteX Corporation as the compound (B) and 26 g of ion-exchanged water, and the resulting mixture was reacted at 90° C. while stirring at 200 rpm for 90 minutes. The obtained reaction solution was cooled to 25° C., and then subjected to filtration using a 5 μm filter (cellulose acetate membrane) available from Sartorius Inc., thereby obtaining a pigment water dispersion of pigment-containing modified polymer particles having a nonvolatile content of 26% by mass (as a total content of polymer 1+pigment+compound (B)).

<Step (III)>

Nine grams of glycerin, 11 g of propylene glycol, 7 g of 2-pyrrolidone, 0.5 g of "OLEFIN E1010" (wetting agent; ethyleneoxide (10 mol) adduct of acetylenediol) available from Nissin Chemical Industry Co., Ltd., 1 g of 2-butyl-2-ethyl-1,3-propanediol, 7 g of triethylene glycol monobutyl ether and 0.9 g of ion-exchanged water were added and mixed in a water dispersion for ink-jet printing constituted of 63.6 g of the pigment water dispersion obtained in the aforementioned step (II). The resulting mixed solution was subjected to filtration using a 5 μm filter (cellulose acetate membrane) available from Sartorius Inc., thereby obtaining an ink 1 having a pigment concentration of 10% by mass.

Comparative Example 1

The same procedure as in Example 1 was repeated except that the step (II) of Example 1 was not conducted, thereby producing a comparative ink 1.

Example 2

The same procedure as in Example 1 was repeated except for using the polymer 2 solution (solid content: 40% by mass) in place of the polymer 1 solution in the step (I) of Example 1, thereby producing an ink 2.

Comparative Example 2

The same procedure as in Example 2 was repeated except that the step (II) of Example 2 was not conducted, thereby producing a comparative ink 2.

Example 3

The same procedure as in Example 1 was repeated except for using the polymer 3 solution (solid content: 40% by mass) in place of the polymer 1 solution in the step (I) of Example 1, thereby producing an ink 3.

Comparative Example 3

The same procedure as in Example 3 was repeated except that the step (II) of Example 3 was not conducted, thereby producing a comparative ink 3.

TABLE 2

| | Polymer Particles (A) | | | Compound (B) | | | | |
| --- | --- | --- | --- | --- | --- | --- | --- | --- |
| | | | | | | Molar | | |
| | Pigment | Polymer | Functional group (mmol) | Kind | Epoxy equivalent | number of addition of EO*[1] | Amount used mol/g*[2] | Functional group (mmol) |
| Example 1 | Magenta | Polymer 1 | 36.7 | EX145 | 400 | 5 | $1.5 \times 10^{-4}$ | 11.7 |
| Comparative Example 1 | Magenta | Polymer 1 | 36.7 | — | — | — | — | — |
| Example 2 | Magenta | Polymer 2 | 39.6 | EX145 | 400 | 5 | $1.5 \times 10^{-4}$ | 11.7 |
| Comparative Example 2 | Magenta | Polymer 2 | 39.6 | — | — | — | — | — |

TABLE 2-continued

| | | | | | | | |
|---|---|---|---|---|---|---|---|
| Example 3 | Magenta | Polymer 3 | 45.2 | EX145 | 400 | 5 | 1.5 × 10⁻⁴ | 11.7 |
| Comparative Example 3 | Magenta | Polymer 3 | 45.2 | — | — | — | — | — |

Note:
*¹Average molar number of addition of ethyleneoxide
*²Amount based on 1 g of solid components (nonvolatile components) in water dispersion of pigment-containing polymer particles (A)

| | | | Productivity | Viscosity of ink | | |
|---|---|---|---|---|---|---|
| | Molar ratio (B)/(A)*³ | Average particle size (nm) | Filterability | Viscosity of ink (mPa · s) | After being concentrated (mPa · s) | Rub fastness |
| Example 1 | 0.32 | 116 | A | 8.9 | 116 | A |
| Comparative Example 1 | — | 112 | A | 8.5 | 850 | B |
| Example 2 | 0.30 | 110 | A | 8.6 | 135 | A |
| Comparative Example 2 | — | 115 | A | 8.7 | 950 | B |
| Example 3 | 0.26 | 108 | A | 9 | 185 | A |
| Comparative Example 3 | — | 113 | A | 8.8 | 900 | B |

Note:
*³Ratio of total moles of reactive group of compound (B) to total moles of functional group of pigment-containing polymer particles (A)

From Table 2, it was confirmed that the inks obtained in Examples 1 to 3 were excellent in viscosity after concentrating the ink as well as rub fastness of the printed characters or images as compared to the inks obtained in Comparative Examples 1 to 3.

Example 4

<Step (I): Production of Water Dispersion of Pigment-Containing Polymer Particles (A)>

"JONCRYL 68" (styrene/acrylic acid copolymer; Mw: 12000; acid value: 195 mgKOH/g) available from BASF Corporation was weighed in an amount of 51.43 g and added to an aqueous solution containing 21.16 g of a 5 N (16.8% by mass) sodium hydroxide aqueous solution and 432 g of ion-exchanged water, and then the obtained mixture was heated and dissolved at 90° C. while stirring at 200 rpm for 8 hours, thereby obtaining a polymer dispersion. The resulting polymer dispersion was mixed with 120 g of a magenta pigment (PR122) "CFR6114JC" available from Dainichiseika Color & Chemicals Mfg. Co., Ltd., and stirred at 15° C. using the disper at 6400 rpm for 1 hour, thereby obtaining a mixed solution. Next, the thus obtained mixed solution was subjected to dispersion treatment at 15° C. under a pressure of 150 MPa by allowing the solution to pass through "MICROFLUIDIZER" available from Microfluidics Corp., 10 times, thereby obtaining a dispersion. Thereafter, the obtained dispersion was subjected to centrifugal separation and then to filtration using a 5 μm filter (cellulose acetate membrane) available from Sartorius Inc., followed by adding ion-exchanged water to the resulting product, thereby obtaining a water dispersion of pigment-containing polymer particles (A) having a nonvolatile content of 27% by mass (as a total content of "JONCRYL 68"+pigment).
<Step (II)>

Added and mixed in 300 g of the water dispersion obtained in the aforementioned step (I) were 2.37 g of "EX-321" (trimethylolpropane polyglycidyl ether; epoxy equivalent: 140) available from Nagase ChemteX Corporation as a crosslinking agent, 4.68 g (1.5×10⁻⁴ mol based on 1 g of the nonvolatile components in the dispersion obtained in the step (I)) of the aforementioned "EX-145" available from Nagase ChemteX Corporation as the compound (B) and 19.0 g of ion-exchanged water, and the resulting mixture was reacted at 90° C. while stirring at 200 rpm for 90 minutes. The obtained reaction solution was cooled to 25° C., and then subjected to filtration using a 5 μm filter (cellulose acetate membrane) available from Sartorius Inc., thereby obtaining a pigment water dispersion of pigment-containing modified polymer particles having a nonvolatile content of 27% by mass (as a total content of "JONCRYL 68"+pigment+compound (B)).
<Step (III)>

Nine grams of glycerin, 11 g of propylene glycol, 7 g of 2-pyrrolidone, 0.5 g of "OLEFIN E1010" available from Nissin Chemical Industry Co., Ltd., 1 g of 2-butyl-2-ethyl-1,3-propanediol, 7 g of triethylene glycol monobutyl ether and 7 g of ion-exchanged water were added and mixed in a water dispersion for ink-jet printing constituted of 57.5 g of the pigment water dispersion obtained in the aforementioned step (II). The resulting mixed solution was subjected to filtration using a 5 μm filter (cellulose acetate membrane) available from Sartorius Inc., thereby obtaining an ink 4 having a pigment concentration of 10% by mass.

Comparative Example 4

<Step (I): Production of Water Dispersion of Pigment-Containing Polymer Particles (A)>

The same procedure as in the step (I) of Example 4 was repeated.
<Step (II)>

The same procedure as in the step (II) of Example 4 was repeated except that the aforementioned "EX-145" available from Nagase ChemteX Corporation as the compound (B) and ion-exchanged water were used in the step (II) in amounts of 1.56 g (0.5×10⁻⁴ mol based on 1 g of the nonvolatile components in the water dispersion obtained in the step (I)) and 10.6 g, respectively, thereby obtaining a pigment water dispersion.
<Step (III)>

The subsequent procedure was conducted in the same manner as in Example 4 except that the pigment water dispersion obtained in the step (II) and ion-exchanged water were used in amounts of 55.5 g and 90 g, respectively, thereby obtaining a comparative ink 4.

Example 5

<Step (I): Production of Water Dispersion of Pigment-Containing Polymer Particles (A)>

The same procedure as in the step (I) of Example 4 was repeated.

<Step (II)>

The same procedure as in the step (II) of Example 4 was repeated except that the aforementioned "EX-145" available from Nagase ChemteX Corporation as the compound (B) and ion-exchanged water were used in the step (II) in amounts of 14.05 g ($4.5 \times 10^{-4}$ mol based on 1 g of the nonvolatile components in the water dispersion obtained in the step (I)) and 44.4 g, respectively, thereby obtaining a pigment water dispersion.

<Step (III)>

The subsequent procedure was conducted in the same manner as in Example 4 except that the pigment water dispersion obtained in the step (II) and ion-exchanged water were used in amounts of 63.6 g and 0.9 g, respectively, thereby obtaining an ink 5.

Comparative Example 5

<Step (I): Production of Water Dispersion of Pigment-Containing Polymer Particles (A)>

The same procedure as in the step (I) of Example 4 was repeated.

<Step (II)>

The subsequent procedure was conducted in the same manner as in Example 4 except that the aforementioned "EX-145" available from Nagase ChemteX Corporation as the compound (B) and ion-exchanged water were used in the step (II) in amounts of 18.72 g ($6.0 \times 10^{-4}$ mol based on 1 g of the nonvolatile components in the dispersion obtained in the step (I)) and 57 g, respectively. However, the resulting reaction product was gelled, and it was therefore not possible to prepare an ink. It was considered that probably, owing to an excessively large amount of the compound (B) used to react with the carboxy group, the amount of the carboxy group as a charge repulsion group present in the reaction was reduced, so that the reaction system became unstable.

TABLE 3

| | Polymer Particles (A) | | | Compound (B) | | | |
|---|---|---|---|---|---|---|---|
| | Pigment | Polymer | Functional group (mmol) | Kind | Epoxy equivalent | Molar number of addition of EO*1 | Amount used mol/g*2 | Functional group (mmol) |
| Example 4 | Magenta | JONCRYL | 67.7 | EX145 | 400 | 5 | $1.5 \times 10^{-4}$ | 11.7 |
| Comparative Example 4 | Magenta | JONCRYL | 67.7 | EX145 | 400 | 5 | $0.5 \times 10^{-4}$ | 3.9 |
| Example 5 | Magenta | JONCRYL | 67.7 | EX145 | 400 | 5 | $4.5 \times 10^{-4}$ | 35.1 |
| Comparative Example 5 | Magenta | JONCRYL | 67.7 | EX145 | 400 | 5 | $6.0 \times 10^{-4}$ | 46.8 |

Note:
*1Average molar number of addition of ethyleneoxide
*2Amount based on 1 g of solid components (nonvolatile components) in water dispersion of pigment-containing polymer particles (A)

| | | Productivity | | Viscosity of ink | | |
|---|---|---|---|---|---|---|
| | Molar ratio (B)/(A)*3 | Average particle size (nm) | Filterability | Viscosity of ink (mPa · s) | After being concentrated (mPa · s) | Rub fastness |
| Example 4 | 0.17 | 122 | A | 10.6 | 330 | B |
| Comparative Example 4 | 0.06 | 121 | A | 9.8 | 1000> | B |
| Example 5 | 0.52 | 119 | A | 12.8 | 280 | B |
| Comparative Example 5 | 0.69 | Not producible | | — | — | — |

Note:
*3Ratio of total moles of reactive group of compound (B) to total moles of functional group of pigment-containing polymer particles (A)

From Table 3, it was confirmed that the ink obtained in Comparative Example 4 had excessively high viscosity after the ink was concentrated owing to an excessively small amount of the compound (B) used, whereas in Comparative Example 5, it was not possible to produce an ink owing to an excessively large amount of the compound (B) used.

Comparative Example 6

<Step (I): Production of Water Dispersion of Pigment-Containing Polymer Particles (A)>

The same procedure as in the step (I) of Example 4 was repeated.

<Step (II)>

Added and mixed in 300 g of the water dispersion obtained in the aforementioned step (I) were 2.37 g of the aforementioned "EX-321" available from Nagase ChemteX Corporation as a crosslinking agent and 19.0 g of ion-exchanged water, and the resulting mixture was reacted at 90° C. while stirring at 200 rpm for 90 minutes. The obtained reaction solution was cooled to 25° C., and 4.68 g (1.5×10$^{-4}$ mol based on 1 g of the nonvolatile components in the dispersion obtained in the step (I)) of the aforementioned "EX-145" available from Nagase ChemteX Corporation as the compound (B) was added thereto, and then the resulting reaction mixture was subjected to filtration using a 5 μm filter (cellulose acetate membrane) available from Sartorius Inc., thereby obtaining a pigment water dispersion having a nonvolatile content of 27% by mass (as a total content of "JONCRYL 68"+pigment+compound (B)).

"EX-145" added was merely simply mixed but not reacted.

<Step (III)>

The subsequent procedure was conducted in the same manner as in Example 4, thereby obtaining a comparative ink 6.

Comparative Example 7

<Step (I): Production of Water Dispersion of Pigment-Containing Polymer Particles (A)>

The same procedure as in the step (I) of Example 4 was repeated.

<Step (II)>

Added and mixed in 300 g of the water dispersion obtained in the aforementioned step (I) were 2.37 g of the aforementioned "EX-321" available from Nagase ChemteX Corporation as a crosslinking agent and 1.43 g (1.5×10$^{-4}$ mol based on 1 g of the nonvolatile components in the dispersion obtained in the step (I)) of the aforementioned "EX-850" available from Nagase ChemteX Corporation as a bifunctional segment containing EO groups, followed by further adding and mixing 10.3 g of ion-exchanged water therein, and the resulting mixture was reacted at 90° C. while stirring at 200 rpm for 90 minutes. The obtained reaction solution was cooled to 25° C. and then subjected to filtration using a 5 μm filter (cellulose acetate membrane) available from Sartorius Inc., thereby obtaining a pigment water dispersion having a nonvolatile content of 27% by mass (as a total content of "JONCRYL 68"+pigment+"EX-850").

<Step (III)>

The subsequent procedure was conducted in the same manner as in Example 4 except that the pigment water dispersion obtained in the step (II) and ion-exchanged water were used in amounts of 55.4 g and 9.1 g, respectively, thereby obtaining a comparative ink 7.

Comparative Example 8

<Step (I): Production of Water Dispersion of Pigment-Containing Polymer Particles (A)>

The aforementioned "JONCRYL 68" (styrene/acrylic acid copolymer) available from BASF Corporation was weighed in an amount of 51.43 g and added to an aqueous solution containing 21.16 g of a 5 N (16.8% by mass) sodium hydroxide aqueous solution and 432 g of ion-exchanged water, and the obtained mixture was heated and dissolved at 90° C. while stirring at 200 rpm for 8 hours, thereby obtaining a polymer dispersion. Added and mixed in the thus obtained polymer dispersion was 9.94 g (1.5×10$^{-4}$ mol based on 1 g of the nonvolatile components (pigment+"JONCRYL 68") in the dispersion obtained in the step (I)) of the aforementioned "EX-145" available from Nagase ChemteX Corporation as the compound (B), and the obtained mixture was reacted at 90° C. with stirring at 200 rpm for 90 minutes. The resulting reaction solution was further mixed with 120 g of a magenta pigment (PR122) "CFR6114JC" available from Dainichiseika Color & Chemicals Mfg. Co., Ltd., and stirred at 15° C. using the disper at 6400 rpm for 1 hour, thereby obtaining a mixed solution. Next, the thus obtained mixed solution was subjected to dispersion treatment at 15° C. under a pressure of 150 MPa by allowing the solution to pass through "MICRO-FLUIDIZER" available from Microfluidics Corp., 10 times, thereby obtaining a dispersion. Thereafter, the obtained dispersion was subjected to centrifugal separation and then to filtration using a 5 μm filter (cellulose acetate membrane) available from Sartorius Inc., followed by adding ion-exchanged water to the resulting product, thereby obtaining a water dispersion of pigment-containing polymer particles (A) having a nonvolatile content of 27% by mass (as a total content of "JONCRYL 68"+pigment).

<Step (II)>

Added and mixed in 300 g of the water dispersion obtained in the aforementioned step (I) were 2.37 g of the aforementioned "EX-321" available from Nagase ChemteX Corporation as a crosslinking agent and 6.4 g of ion-exchanged water, and the resulting mixture was reacted at 90° C. while stirring at 200 rpm for 90 minutes. The obtained reaction solution was cooled to 25° C., and then subjected to filtration using a 5 μm filter (cellulose acetate membrane) available from Sartorius Inc., thereby obtaining a pigment water dispersion having a nonvolatile content of 27% by mass (as a total content of "JONCRYL 68"+pigment+compound (B)).

Meanwhile, the aforementioned "EX-145" as the compound (B) was not used in the step (II).

<Step (III)>

The subsequent procedure was conducted in the same manner as in Example 4 except that the pigment water dispersion obtained in the step (II) and ion-exchanged water were used in amounts of 54.6 g and 10 g, respectively, thereby obtaining a comparative ink 8.

Comparative Example 9 (Production of Surface-Treated Carbon Black)

Eighty parts of self-dispersible carbon black subjected to oxidative treatment with a peroxodisulfuric acid salt (acid group content: 800 μmol/g; DBP oil absorption: 105 mL/100 g; solid content: 15% by mass) were mixed with 0.46 part of methyl glycidyl ether (molecular weight: 88) available from Wako Pure Chemical Industries, Ltd., as the compound (B), and further mixed with 2.59 parts of ion-exchanged water, and the resulting mixture was stirred at 80° C. for 3 hours, thereby obtaining a water dispersion of the surface-treated carbon black. At this time, the amount of the methyl glycidyl ether used on the basis of 100 parts of the carbon black was 3.8 parts.

Thereafter, the resulting water dispersion was placed at 60° C. under reduced pressure to remove a part of water from the dispersion. Furthermore, the obtained dispersion was subjected to centrifugal separation and then to filtration using a 5 μm filter (cellulose acetate membrane) available from Sartorius Inc., thereby obtaining a dispersion having a nonvolatile content of 18% by mass (as a total content of pigment).

The subsequent procedure was conducted in the same manner as in Example 4 except that the pigment water dispersion obtained in the step (II) and ion-exchanged water were used in amounts of 57.7 g and 6.8 g, respectively, thereby obtaining a comparative ink 9.

TABLE 4

| | Polymer Particles (A) | | | Compound (B) | | | |
|---|---|---|---|---|---|---|---|
| | Pigment | Polymer | Functional group (mmol) | Kind | Epoxy equivalent | Molar number of addition of EO*1 | Amount used mol/g*2 |
| Comparative Example 6 | Magenta | JONCRYL | 67.7 | EX145 (not reacted) | 400 | 5 | $1.5 \times 10^{-4}$ |
| Comparative Example 7 | Magenta | JONCRYL | 67.7 | EX-850 (bifunctional) | 122 | 2 | $1.5 \times 10^{-4}$ |
| Comparative Example 8 | Magenta | JONCRYL/ EX145 | — | — | 400 | 5 | $1.5 \times 10^{-4}$ |
| Comparative Example 9 | CB | — | — | Methyl glycidyl ether | 88 | 0 | — |

Note:
*1Average molar number of addition of ethyleneoxide
*2Amount based on 1 g of solid components (nonvolatile components) in water dispersion of pigment-containing polymer particles (A)

| | | Productivity | | Viscosity of ink | | |
|---|---|---|---|---|---|---|
| | Molar ratio (B)/(A)*3 | Average particle size (nm) | Filterability | Viscosity of ink (mPa · s) | After being concentrated (mPa · s) | Rub fastness |
| Comparative Example 6 | — | 126 | A | 10.5 | 1000> | C |
| Comparative Example 7 | 0.17 | 118 | C | 9 | 700 | D |
| Comparative Example 8 | — | 135 | C | 9.2 | 830 | B |
| Comparative Example 9 | — | 135 | B | 11.0 | 1000> | C |

Note:
*3Ratio of total moles of reactive group of compound (B) to total moles of functional group of pigment-containing polymer particles (A)

From Table 4, it was confirmed that the ink obtained in Comparative Example 6 in which the compound (B) and the polymer particles (A) were not reacted with each other had high viscosity after concentrating the ink and was deteriorated in rub fastness; the ink obtained in Comparative Example 7 in which the bifunctional compound (B) was used was deteriorated in productivity and rub fastness; the ink obtained in Comparative Example 8 in which the compound (B) was reacted upon production of the polymer dispersion was deteriorated in productivity; and the ink obtained in Comparative Example 9 in which the compound (B) was directly reacted with the pigment had high viscosity after concentrating the ink and was also deteriorated in rub fastness.

Example 6

<Step (I): Production of Water Dispersion of Pigment-Containing Polymer Particles (A)>
The same procedure as in the step (I) of Example 4 was repeated.
<Step (II)>
The same procedure as in the step (II) of Example 4 was repeated except that the compound (B1) (epoxy equivalent: 230; average number of addition of EO: 1) obtained in Synthesis Example 1 and ion-exchanged water were used in the step (II) in amounts of 2.62 g ($1.50 \times 10^{-4}$ mol based on 1 g of the nonvolatile components in the dispersion obtained in the step (I)) and 13.7 g, respectively, thereby obtaining a pigment water dispersion.
<Step (III)>
The subsequent procedure was conducted in the same manner as in Example 4 except that the pigment water dispersion obtained in the step (II) and ion-exchanged water were used in amounts of 56.2 g and 8.3 g, respectively, thereby obtaining an ink 6.

Example 7

<Step (I): Production of Water Dispersion of Pigment-Containing Polymer Particles (A)>
The same procedure as in the step (I) of Example 4 was repeated.
<Step (II)>
The same procedure as in the step (II) of Example 4 was repeated except that the compound (B2) (epoxy equivalent: 300; average number of addition of EO: 2) obtained in Synthesis Example 2 and ion-exchanged water were used in the step (II) in amounts of 3.51 g ($1.50 \times 10^{-4}$ mol based on 1 g of the nonvolatile components in the dispersion obtained in the step (I)) and 15.9 g, respectively, thereby obtaining a pigment water dispersion.
<Step (III)>
The subsequent procedure was conducted in the same manner as in Example 4 except that the pigment water dispersion obtained in the step (II) and ion-exchanged water were used in amounts of 56.8 g and 7.8 g, respectively, thereby obtaining an ink 7.

Example 8

<Step (I): Production of Water Dispersion of Pigment-Containing Polymer Particles (A)>
The same procedure as in the step (I) of Example 4 was repeated.

<Step (II)>

The same procedure as in the step (II) of Example 4 was repeated except that lauryl polyethyleneoxide (5 mol) glycidyl ether (epoxy equivalent: 347; average number of addition of EO: 5) available from Nagase ChemteX Corporation and ion-exchanged water were used in the step (II) in amounts of 4.06 g ($1.50\times10^{-4}$ mol based on 1 g of the nonvolatile components in the dispersion obtained in the step (I)) and 17.4 g, respectively, thereby obtaining a pigment water dispersion.

<Step (III)>

The subsequent procedure was conducted in the same manner as in Example 4 except that the pigment water dispersion obtained in the step (II) and ion-exchanged water were used in amounts of 57.1 g and 7.4 g, respectively, thereby obtaining an ink 8.

Example 9

<Step (I): Production of Water Dispersion of Pigment-Containing Polymer Particles (A)>

The same procedure as in the step (I) of Example 4 was repeated.

<Step (II)>

The same procedure as in the step (II) of Example 4 was repeated except that the compound (B3) (epoxy equivalent: 550; average number of addition of EO: 9) obtained in Synthesis Example 3 and ion-exchanged water were used in the step (II) in amounts of 6.44 g ($1.50\times10^{-4}$ mol based on 1 g of the nonvolatile components in the dispersion obtained in the step (I)) and 23.8 g, respectively, thereby obtaining a pigment water dispersion.

<Step (III)>

The subsequent procedure was conducted in the same manner as in Example 4 except that the pigment water dispersion obtained in the step (II) and ion-exchanged water were used in amounts of 58.7 g and 5.8 g, respectively, thereby obtaining an ink 9.

Example 10

<Step (I); Production of Water Dispersion of Pigment-Containing Polymer Particles (A)>

The same procedure as in the step (I) of Example 4 was repeated.

<Step (II)>

The same procedure as in the step (II) of Example 4 was repeated except that "EX-171" (lauryl polyethyleneoxide (15 mol) glycidyl ether; epoxy equivalent: 971; average number of addition of EO: 15) available from Nagase ChemteX Corporation and ion-exchanged water were used in the step (II) in amounts of 11.36 g ($1.50\times10^{-4}$ mol based on 1 g of the nonvolatile components in the dispersion obtained in the step (I)) and 37.1 g, respectively, thereby obtaining a pigment water dispersion.

<Step (III)>

The subsequent procedure was conducted in the same manner as in Example 4 except that the pigment water dispersion obtained in the step (II) and ion-exchanged water were used in amounts of 61.9 g and 2.6 g, respectively, thereby obtaining an ink 10.

Example 11

<Step (I): Production of Water Dispersion of Pigment-Containing Polymer Particles (A)>

The same procedure as in the step (I) of Example 4 was repeated.

<Step (II)>

The same procedure as in the step (II) of Example 4 was repeated except that lauryl polyethyleneoxide (15 mol) glycidyl ether (epoxy equivalent: 1100) available from Nagase ChemteX Corporation and ion-exchanged water were used in the step (II) in amounts of 12.87 g ($1.50\times10^{-4}$ mol based on 1 g of the nonvolatile components in the dispersion obtained in the step (I)) and 41.2 g, respectively, thereby obtaining a pigment water dispersion.

<Step (III)>

The same procedure as in the step (III) of Example 4 was repeated except that the pigment water dispersion obtained in the step (II) and ion-exchanged water were used in amounts of 62.9 g and 1.6 g, respectively, thereby obtaining an ink 11.

Example 12

<Step (I): Production of Water Dispersion of Pigment-Containing Polymer Particles (A)>

The same procedure as in the step (I) of Example 4 was repeated.

<Step (II)>

The same procedure as in the step (II) of Example 4 was repeated except that the compound (B4) (epoxy equivalent: 1350; average number of addition of EO: 23) obtained in Synthesis Example 4 and ion-exchanged water were used in the step (II) in amounts of 10.53 g ($1.00\times10^{-4}$ mol based on 1 g of the nonvolatile components in the dispersion obtained in the step (I)) and 34.9 g, respectively, thereby obtaining a pigment water dispersion.

<Step (III)>

The subsequent procedure was conducted in the same manner as in Example 4 except that the pigment water dispersion obtained in the step (II) and ion-exchanged water were used in amounts of 61.3 g and 3.2 g, respectively, thereby obtaining an ink 12.

Example 13

<Step (I): Production of Water Dispersion of Pigment-Containing Polymer Particles (A)>

The same procedure as in the step (I) of Example 4 was repeated.

<Step (II)>

The same procedure as in the step (II) of Example 4 was repeated except that methyl glycidyl ether (molecular weight: 88; epoxy equivalent: 88; average number of addition of EO: 0) available from Wako Pure Chemical Industries, Ltd., as the compound (B), and ion-exchanged water were used in the step (II) in amounts of 1.03 g ($1.50\times10^{-4}$ mol based on 1 g of the nonvolatile components in the dispersion obtained in the step (I)) and 9.2 g, respectively, thereby obtaining a pigment water dispersion.

<Step (III)>

The subsequent procedure was conducted in the same manner as in Example 4 except that the pigment water dispersion obtained in the step (II) and ion-exchanged water were used in amounts of 55.1 g and 9.4 g, respectively, thereby obtaining an ink 13.

TABLE 5

| | Polymer Particles (A) | | | Compound (B) | | | | |
|---|---|---|---|---|---|---|---|---|
| | | | Functional group (mmol) | | | | Molar number of addition of EO*1 | Amount used mol/g*2 | Functional group (mmol) |
| | Pigment | Polymer | Functional group (mmol) | Kind | Epoxy equivalent | Molar number of addition of EO*1 | Amount used mol/g*2 | Functional group (mmol) |
| Example 6 | Magenta | JONCRYL | 67.7 | Compound (B1) | 230 | 1 | $1.5 \times 10^{-4}$ | 11.7 |
| Example 7 | Magenta | JONCRYL | 67.7 | Compound (B2) | 300 | 2 | $1.5 \times 10^{-4}$ | 11.7 |
| Example 8 | Magenta | JONCRYL | 67.7 | EX-e8*4 | 347 | 5 | $1.5 \times 10^{-4}$ | 11.7 |
| Example 4 | Magenta | JONCRYL | 67.7 | EX145 | 400 | 5 | $1.5 \times 10^{-4}$ | 11.7 |
| Example 9 | Magenta | JONCRYL | 67.7 | Compound (B3) | 550 | 9 | $1.5 \times 10^{-4}$ | 11.7 |
| Example 10 | Magenta | JONCRYL | 67.7 | EX171 | 971 | 15 | $1.5 \times 10^{-4}$ | 11.7 |
| Example 11 | Magenta | JONCRYL | 67.7 | EX-e11*5 | 1100 | 15 | $1.5 \times 10^{-4}$ | 11.7 |
| Example 12 | Magenta | JONCRYL | 67.7 | Compound (B4) | 1350 | 23 | $1.0 \times 10^{-4}$ | 7.8 |
| Example 13 | Magenta | JONCRYL | 67.7 | Methyl glycidyl ether | 88 | 0 | $1.5 \times 10^{-4}$ | 11.7 |

Note:
*1 Average molar number of addition of ethyleneoxide
*2 Amount based on 1 g of solid components (nonvolatile components) in water dispersion of pigment-containing polymer particles (A)
*4 Lauryl polyethyleneoxide (5 mol) glycidyl ether; epoxy equivalent: 347
*5 Lauryl polyethyleneoxide (15 mol) glycidyl ether; epoxy equivalent: 1100

| | Molar ratio (B)/(A)*3 | Productivity Average particle size (nm) | Filterability | Viscosity of ink (mPa·s) | Viscosity of ink After being concentrated (mPa·s) | Rub fastness |
|---|---|---|---|---|---|---|
| Example 6 | 0.17 | 119 | A | 8.6 | 480 | B |
| Example 7 | 0.17 | 118 | A | 9.1 | 420 | B |
| Example 8 | 0.17 | 123 | A | 9.6 | 390 | B |
| Example 4 | 0.17 | 122 | A | 10.6 | 330 | B |
| Example 9 | 0.17 | 126 | A | 11.3 | 210 | B |
| Example 10 | 0.17 | 128 | A | 11.9 | 250 | B |
| Example 11 | 0.17 | 119 | A | 12.9 | 260 | B |
| Example 12 | 0.12 | 128 | A | 12.8 | 300 | B |
| Example 13 | 0.17 | 121 | A | 8.7 | 700 | B |

Note:
*3 Ratio of total moles of reactive group of compound (B) to total moles of functional group of pigment-containing polymer particles (A)

From Table 5, it was confirmed that the inks obtained in Examples 4 and 6 to 13 were free of formation of coarse particles upon production of the pigment particles, had high productivity, were prevented from suffering form increase in viscosity thereof when the ink was being concentrated by evaporation of water from the ink, and were excellent in rub fastness when printed on a low-water absorbing recording medium.

In addition, in the case where the ink was prepared from the polymer particles (A) and the unreacted compound (B), as recognized from the results of Comparative Example 6 shown in Table 4, it was confirmed that the ink obtained in Comparative Example 6 had a viscosity of more than 1000 mPa·s after being concentrated and a rub fastness of Rank C, whereas the inks obtained in Examples 4 and 6 to 13 were prevented from suffering from increase in viscosity thereof when the ink was being concentrated by evaporation of water from the ink, and had excellent rub fastness.

INDUSTRIAL APPLICABILITY

In accordance with the present invention, it is possible to provide a process for producing pigment-containing modified polymer particles which is excellent in productivity of fine pigment particles, can be prevented from suffering from increase in viscosity of the ink when the ink is being concentrated by evaporation of water from the ink, and is excellent in rub fastness of the printed characters or images when printed on a low-water absorbing recording medium; and a pigment water dispersion and an ink including the pigment-containing modified polymer particles produced by the process.

The ink containing the pigment water dispersion according to the present invention can be suitably used for ink-jet printing.

The invention claimed is:

1. A process for producing pigment-containing modified polymer particles, comprising the step of: reacting
pigment-containing polymer particles (A) comprising a functional group, wherein the functional group of the polymer particles (A) is at least one group selected from the group consisting of a carboxy group, a sulfonic group, and a phosphoric group, and
a compound (B) comprising only one reactive group capable of reacting with the functional group of the polymer particles (A), wherein the sole reactive group of the compound (B) is a single group selected from the group consisting of an epoxy group, a glycidyl group, an isocyanate group, an aziridino group, an amino group, and an oxazoline group, in a medium under such a condition that a ratio [(B)/(A)] of total moles of the reactive group of the compound (B) to total moles of the functional group of the polymer particles (A) is not less than 0.10 and not more than 0.62.

2. The process for producing pigment-containing modified polymer particles according to claim 1, wherein the medium is an aqueous medium.

3. The process for producing pigment-containing modified polymer particles according to claim 1, wherein the compound (B) comprises at least one ether bond.

4. The process for producing pigment-containing modified polymer particles according to claim 1, wherein the compound (B) comprises a constitutional unit of an alkylene glycol having not less than 2 and not more than 4 carbon atoms.

5. The process for producing pigment-containing modified polymer particles according to claim 1, wherein the reactive group of the compound (B) is an epoxy group, and the compound (B) has an epoxy equivalent of not less than 90 and not more than 1600.

6. The process for producing pigment-containing modified polymer particles according to claim 1, wherein a polymer constituting the polymer particles (A) is an anionic polymer.

7. The process for producing pigment-containing modified polymer particles according to claim 6, wherein the anionic polymer is an anionic vinyl-based polymer, and the anionic vinyl-based polymer comprises a constitutional unit derived from an anionic monomer (a), a constitutional unit derived from a hydrophobic monomer (b) and a constitutional unit derived from a macromer (c).

8. The process for producing pigment-containing modified polymer particles according to claim 6, wherein a mass ratio of the pigment to the anionic polymer [pigment/anionic polymer] in the pigment-containing polymer particles (A) is from 50/50 to 90/10.

9. The process for producing pigment-containing modified polymer particles according to claim 1, wherein the functional group of the polymer particles (A) is a carboxy group, and the reactive group of the compound (B) is an epoxy group or a glycidyl group.

10. The process for producing pigment-containing modified polymer particles according to claim 1, wherein the compound (B) is at least one glycidyl ether selected from the group consisting of methyl glycidyl ether, ethyl glycidyl ether, allyl glycidyl ether, 2-ethylhexyl glycidyl ether, phenyl glycidyl ether, tert-butylphenyl glycidyl ether, alkyl polyethyleneoxide glycidyl ethers, alkyl polypropyleneoxide glycidyl ethers, phenol polyethyleneoxide glycidyl ether and butoxy polyethyleneoxide glycidyl ether.

11. The process for producing pigment-containing modified polymer particles according to claim 1, wherein a molecular weight of the compound (B) is not less than 250 and not more than 1200.

* * * * *